(12) United States Patent  
Meier et al.

(10) Patent No.: US 7,844,057 B2
(45) Date of Patent: Nov. 30, 2010

(54) ROAMING USING REASSOCIATION

(75) Inventors: Robert Meier, Cuyahoga Falls, OH (US); Richard D. Rebo, Fairlawn, OH (US); Victor J. Griswold, North Canton, OH (US); Douglas Smith, Stouffvile (CA); Nancy Cam Winget, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 434 days.

(21) Appl. No.: 11/772,584

(22) Filed: Jul. 2, 2007

(65) Prior Publication Data

US 2007/0288997 A1 Dec. 13, 2007

Related U.S. Application Data

(62) Division of application No. 10/417,653, filed on Apr. 17, 2003, now Pat. No. 7,350,077.

(60) Provisional application No. 60/429,714, filed on Nov. 26, 2002, provisional application No. 60/439,419, filed on Jan. 10, 2003.

(51) Int. Cl.
*H04K 1/00* (2006.01)

(52) U.S. Cl. ........................ 380/270; 713/150; 713/168; 455/436; 455/437; 455/438; 455/439; 455/440; 709/225; 709/226; 709/229; 370/331; 370/332; 370/333; 370/334; 380/255

(58) Field of Classification Search .................. 380/270, 380/255; 709/225, 226, 229; 455/436–445; 370/331–334; 713/168, 150
See application file for complete search history.

(56) References Cited

U.S. PATENT DOCUMENTS

| 6,581,093 B1 * | 6/2003 | Verma ......................... 709/220 |
| 6,657,981 B1 * | 12/2003 | Lee et al. ..................... 370/331 |
| 2002/0002678 A1 * | 1/2002 | Chow et al. .................. 713/169 |
| 2002/0126849 A1 * | 9/2002 | Howard et al. ............... 380/277 |

* cited by examiner

*Primary Examiner*—Edan Orgad
*Assistant Examiner*—Roderick Tolentino
(74) *Attorney, Agent, or Firm*—Tucker Ellis & West LLP

(57) ABSTRACT

A method and system for handling roaming mobile nodes in a wireless network. The system uses a Subnet Context Manager to store current Network session keys, security policy and duration of the session (e.g. session timeout) for mobile nodes, which is established when the mobile node is initially authenticated. Pairwise transit keys are derived from the network session key. The Subnet Context Manager handles subsequent reassociation requests. When a mobile node roams to a new access point, the access point obtains the network session key from the Subnet Context Manager and validates the mobile node by computing a new pairwise transient key from the network session key.

20 Claims, 25 Drawing Sheets

Fig. 2 — 200

| 802.1X Authentication Type (202) | NSK computation (204) | NSK length (in bytes) (206) | SCM Acquisition (208) |
|---|---|---|---|
| LEAP | Mutually derived by MN and AS | 16 | Radius attribute: MS-MPPE single-key |
| PEAP | Mutually derived by MN and AS | 32 | Radius attribute: MS-MPPE Recv-key (ignore Send-key) |
| EAP-TLS | Mutually derived by MN and AS | 32 | Radius attribute: MS-MPPE Recv-key (ignore Send-key) |
| EAP-MD5 | None | 5, 13 OR 16 | Static configuration |

Fig. 3 — 300

| OUI (302) | Type (304) | Meaning (306) |
|---|---|---|
| 00:50:F2 | 0 | No Authenticated Key Management |
| 00:50:F2 | 1 | Authenticated Key Management using unspecified authentication over 802.1X: default for SSN |
| 00:50:F2 | 2 | Authenticated Key Management using pre-shared key over 802.1X |
| 00:50:F2 | 3-255 | Reserved |
| 00:40:96 | Agreed value | CCKM** |
| Other | Any | Vendor Specific |

| Field | Lenght (bytes) | Description |
|---|---|---|
| State | 2 | Indicates whether this node is Active or not |
| STA Addr | 8 | WLCCP Node identifier: MN's MAC address |
| Authentication Type | 1 | EAP Type used to authenticate |
| Key Management Type | 1 | Type of (or no) key management negotiated. Valid values are: 0-none 1-CCKM 2-SSN/TGi |
| Session Timeout | 4 | Session expiration time provided by the Radius Access Accept |
| KRK | 16 | Key request Key used to authenticate MN's request for context transfers |
| BTK | 32 | Base Transient Key used to derive PTKs |
| RN | 8 | Rekey number used to track how many PTKs have been derived from BTK |
| SSID | 32 | MN's associated SSID |
| VLAN ID | 2 | MN's associated VLAN assignment |
| BSSID | 6 | Defines the current associated AP |
| Cipher | 2 | Negotiated cipher, values are: 0X0000-none 0X0001-WEP 0X0002-TKIP 0X0003-AES-OCB 0X0004-AES-CCMP 0xff<value>-Vendor specific |
| NSK Key length | 2 | Rx key length as specified by MS-MPPE |
| NSK | N | The Rx key resultiung from a successful 802.1X EAP authentication (Rx Key in MS-MPPE) |
| Tx Key length | 2 | Rx key length as specified by MS-MPPE |
| Tx Key | P | The Tx key resulting from a successful 802.1X EAP authentication (Tx Key in MS-MPPE) |

Fig. 4

| Field | Lenght (bytes) | Description |
|---|---|---|
| State | 1 | Indicates whether this node is Active or not. |
| Node-ID | 8 | WLCCP Node identifier: AP's MAC Address (e.g. BSSID) |
| NSK | 16 | The key resulting from a successful LEAP authentication. |
| Session Timeout | 4 | Session expiration time provided by the Radius Access Accept |
| CTK | 32 | The current context transfer key used to protect communications between the SCM Authenticator and the Node-ID |
| Key Sequence Counter | 4 | A sequence counter used to track how many CTK key refreshes have occured |

Fig. 5

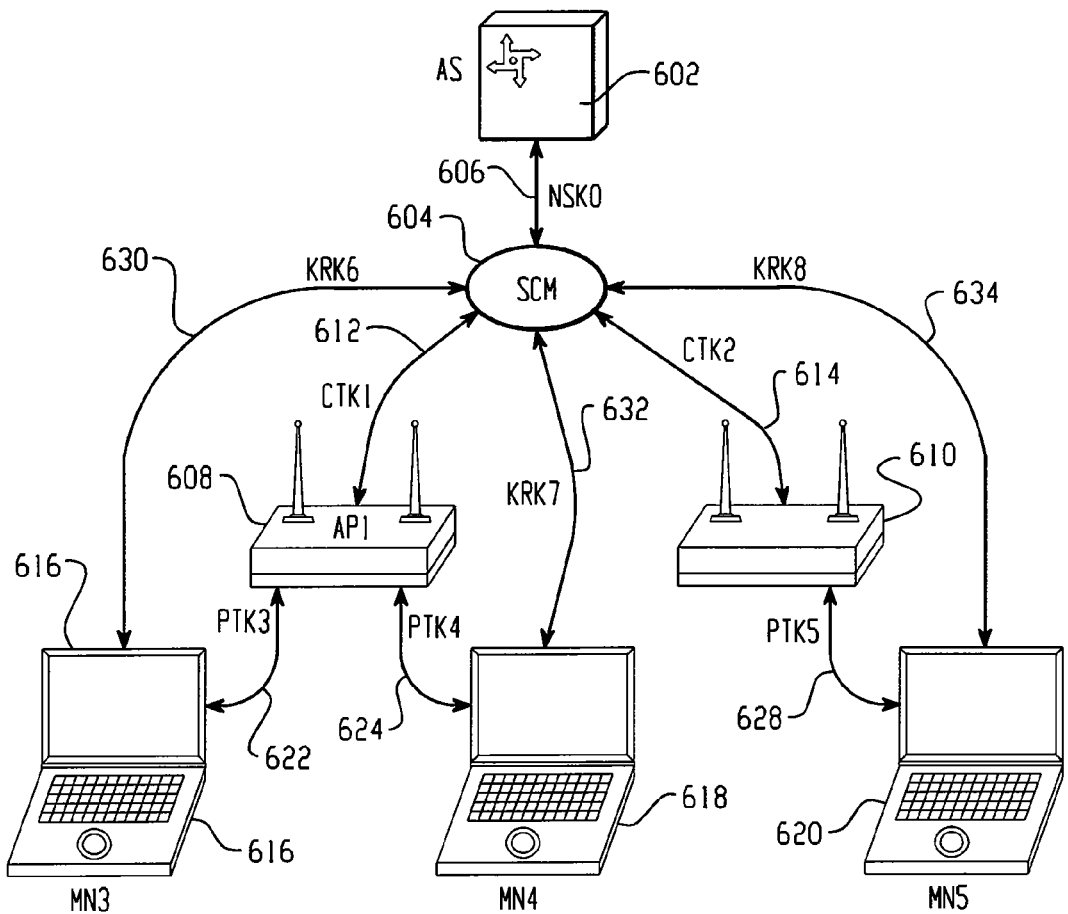

Fig. 6

| AP (702) | SCM (704) | Authentication Server (AS) (706) |
|---|---|---|
| | SCM discards all requests from unauthenticated and unregistered APs | |
| AP receives SCM advertisement. AP must first authenticate to SCM | SCM sending advertisements over wired line, allowing AP and MN authentications. SCM is the Authenticator | |
| WLCCP encapsulated EAP Identify Response ⟶ | | |
| | RADIUS access request with EAP attribute ⟶ | |
| | | ⟵ RADIUS challenge with EAP attribute containing LEAP Server Challenge |
| | ⟵ EAPOL packet with LEAP Server Challenge | |
| WLCCP encapsulated EAPOL packet with LEAP challenge response ⟶ | | |
| | RADIUS access request with EAP attribute ⟶ | |
| | | ⟵ If invalid send a RADIUS deny with an EAP fail attribute |
| | | ⟵ If valid send a RADIUS Access-Challenge message with an EAP success attribute |
| | ⟵ EAPOL packet with EAP Success | |
| WLCCP encapsulated EAPOL packet with LEAP challenge ⟶ | | |
| | RADIUS access request with EAP attribute ⟶ | |
| | | ⟵ RADIUS Access-Accept message with EAP attribute containing LEAP client challenge response and Cisco attributes containing the session and session timeout |

MATCH TO FIG. 7b

*Fig. 7a*

MATCH TO FIG. 7a

| | | | |
|---|---|---|---|
| | SCM caches NSK and session timeout | | |
| | ← EAPOL packet with LEAP client challenge response | | |
| AP installs keys | | | |
| WLCCP(Path Init, provide Nonce$_{AP}$) → | | | |
| | ← If Path Init fails, respond with a non-zero status | | |
| | ← If Path Init succeeds, generate Nonce$_{SCM}$ and derive CTK, set KSC=1 send WLCCP (path Init Reply, Nonce$_{SCM}$, MIC$_{CTK}$) | | |
| Obtain Nonce$_{SCM}$ and derive CTK. | | | |
| If MIC$_{CTK}$ fails, confirm with a non-zero status → | | | |
| If MIC$_{CTK}$ succeeds, set KSC=1, send WLCCP (Path Init Confirm, MIC$_{CTK}$) | | | |
| AP can now protect communications with SCM using delivered CTK, request MN MN context transfers and register MNs | | | |
| WLCCP (Registration Request) → | | | |
| | ← If Registration fails, respond with a non-zero status | | |
| | ← If Registration succeeds send WLCCP (Pre-Registration Response, status=0) | | |

*Fig. 7b*

| MN | AP | SCM |
|---|---|---|
| MN Successfully associates and authenticates to the SCM. Both MN an SCM have NSK. |||
| MN generates Nonce$_{MN}$ | | MN 802.1X authentication is complete, generate Nonce$_{SCM}$ Initiate KRK, BTK initialization |
| | | ←WLCCP_AUTHENTICATE encapsulated EAPOL packet with Nonce$_{SCM}$ |
| | ←EAPOL Key with Nonce$_{SCM}$ | |
| Compute KRK and BTK from PRF(NSK, Nonce$_{MN}$, Nonce$_{SCM}$) RN=1, PTK$_1$=PRF* (BTK,BSSID ‖ RN) Generate MIC$_{MN}$ (KRK, BSSID, MN-ID, Nonce$_{MN}$, Nonce$_{AP}$, RSNIE$_{AP}$) | | |
| EAPOL Key with Nonce$_{MN}$, →RSNIE$_{AP}$, MIC$_{KRK}$ | | |
| | WLCCP Pre-Reg Req packet→ WLTV_SESSION_INIT request with WLTV_SECURE_CONTEX (AP-ID, MN-ID, NONCE$_{MN}$, SSID, MIC$_{KRK}$) | |
| | | ←If SSID, VLAN, MIC$_{MN}$ is invalid, do not update registry, do not generate keys. Send appropriate status value |

MATCH TO FIG.10b

*Fig. 10a*

MATCH TO FIG.10a

| | | |
|---|---|---|
| | | ←If SSID, VLAN, $MIC_{MN}$ is valid, generate KRK, BTK from PRF(NSK, $Nonce_{MN}$, $Nonce_{AP}$), RN=1 Send WLCCP Pre-reg Reply packet with WLTV_SESSION_INIT (WLTV_SECURE_CONTEXT (WTLV_TRANSIENT_KEY (BTK, RN), session timeout)) |
| | ←Cache BTK, RN and session timeout for this MN. Compose response EAPOL Key $Nonce_{MN}$, $RSNIE_{MN}$, $MIC_{AP}$ | |
| MN can receive and transmit protected 802.1X and 802.11 unicast frames to AP | AP can receive and transmit protected 802.1X and 802.11 unicast frames to AP | |
| $MIC_{MN}$ MIC(PTK, BSSID, MN-ID, $Nonce_{MN}$, $Nonce_{AP}$, $RSNIE_{AP}$) EAPOL Key $MIC_{MN}$ → | | |
| | ← EAPOL Key GTK, $Nonce_{GTK}$, $MIC_{GTK}$ | |
| EAPOL Key $Nonce_{GTK}$, MIC → | | |
| Port is fully open; all packets are protected | Port is fully open; all packets are protected | |

Fig. 10b

| 1102 | 1104 | 1106 | 1108 | 1110 | 1112 | 1114 | 1116 | 1118 |
|---|---|---|---|---|---|---|---|---|
| Descriptor Type | Key Info | | EAPOL Replay Ctr | rsvd | Key-ID | MN-ID | BSSID | RN | MIC |
| 1byte | 1byte | 2bytes | 4bytes | 1byte | 1byte | 6bytes | 6bytes | 4bytes | 8bytes |

Fig. 11

| Element ID | Length | OUI | OUI Type | Timestamp | RN | MIC$_{MN}$ |
|---|---|---|---|---|---|---|
| 1 byte | 1 byte | 3 bytes | 1 byte | 8 bytes | 4 bytes | 8 bytes |

*Fig. 13*

| Element ID | Length | OUI | OUI Type | RN | KeyID (unicast) | KeyID (multicast) | multicast key length | MIC$_{AP}$ | EGTK |
|---|---|---|---|---|---|---|---|---|---|
| 1 byte | 1 byte | 3 bytes | 1 byte | 4 bytes | 1 byte | 1 byte | 2 bytes | 8 bytes | multicast key len |

*Fig. 14*

| Field Name | Offset | Size (bytes) | Description |
|---|---|---|---|
| Node Type 1802 | 0 | 2 | (none) = 0<br>AP = 1<br>SCM = 2<br>LCM = 4<br>CCM = 8<br>ICN = 0X10 /* infrastructure */<br>Client = 0X40<br><br>Multicast Flag—0X8000 |
| Node Address 1804 | 2 | 6 | IEEE 48-bit global or locally administered address in canonical (i.e. Ethernet) format. |
*Fig. 18*
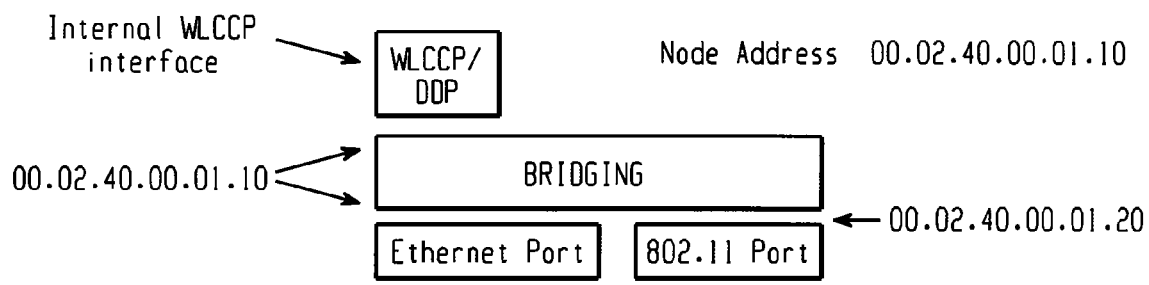
*Fig. 19*
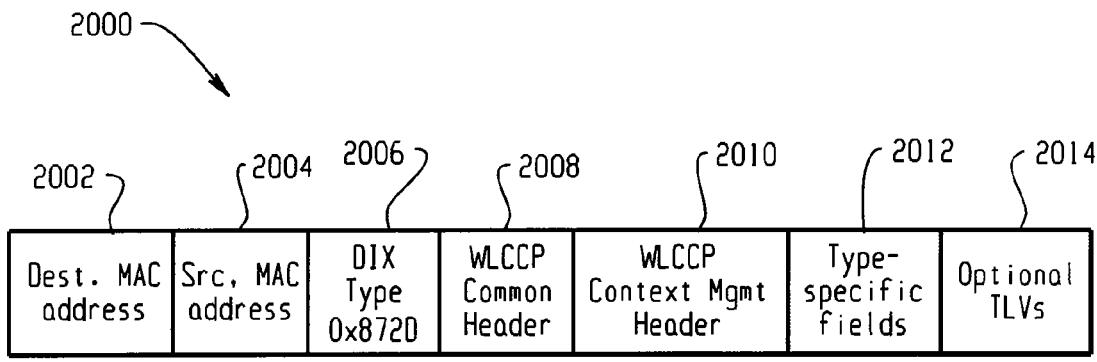
*Fig. 20*

| Field Name | Offset | Size (bytes) | Description |
|---|---|---|---|
| Protocol ID/Version | 0 | 1 | Hex. C1-selected for compatibility with DDP. |
| WLCCP SAP | 1 | 1 | 8-bit protocol service access point ID<br>0 = WLCCP Context Mgmt SAP<br>2 = Radio Resource Mgmt SAP |
| Dest. Node Type | 2 | 2 | Node type of the hop destination |
| Length | 4 | 2 | Length of the message in bytes, including the WLCCP header |
| Type | 6 | 1 | Message Type<br>Bits 0-1—Subtype (0 = Request, 1 = Reply, 2 = Confirm, 3 = Ack)<br>Bits 2-7—Base Message Type |
| Hop Count | 7 | 1 | Number of WLCCP hops |
| Message ID | 8 | 2 | Message sequence number used to match request/reply pairs. |
| Flags | 10 | 2 | Bit 0—Retry flag (set ON in retransmissions)<br>Bit 1—Response-Req flag (set ON to request a reply)<br>Bit 2—TLV flag (set ON to indicate that optional TLVs follow the fixed fields)<br>Bit 3—Inbound Flag<br>Bit 4—Outbound Flag<br>Bit 5—Hopwise-Routing Flag<br>Bit 6—Root CM Flag<br>Bit 7—Relay Flag<br>Bit 8—MIC Flag<br>Bits 9-15—(reserved-must be 0) |
| Originator Node ID | 12 | 8 | Originator Node Type and Node Address |
| Responder Node ID | 20 | 8 | Responder Node Type and Node Address |
| Data | 28 | N | Type-specific fields and TLVs |

Fig. 21

| Field Name | Offset | Size (bytes) | Description |
|---|---|---|---|
| Type | 0 | 2 | TLV identifier<br><br>Bit 0—Container Flag<br>Bit 1—Encrypted Flag<br>Bits 2-3—(reserved—must be zero)<br>Bits 4-7—Group ID<br>Bit 8—Request Flag<br>Bits 9-15—Type ID |
| Length | 2 | 2 | Length of the TLV, including the Type and Length fields. |
| Value | 4 | N | Type-specific data, if the Request Flag is OFF |
Fig. 22
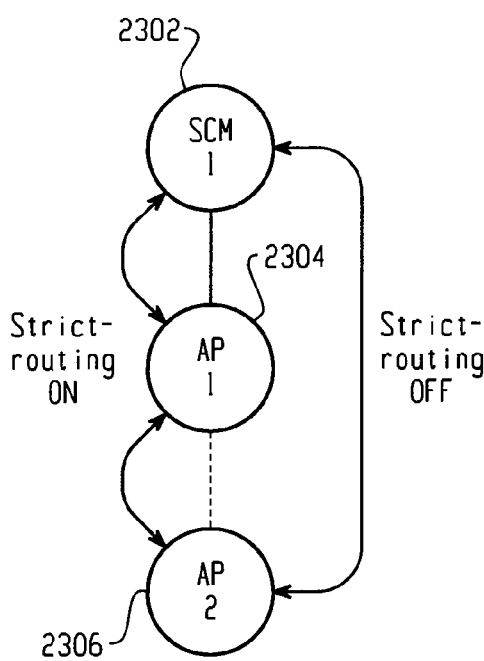
Fig. 23
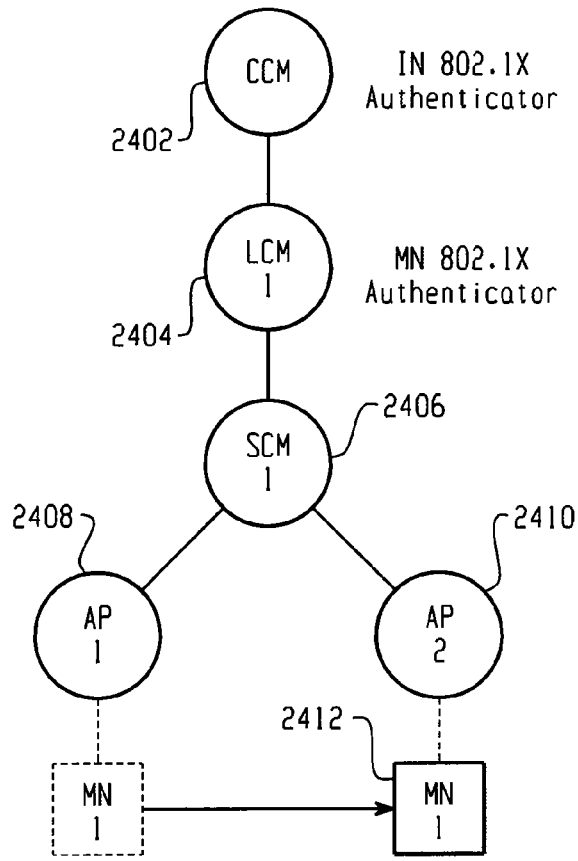
Fig. 24

ROAMING USING REASSOCIATION

CROSS-REFERENCE TO RELATED APPLICATIONS

This application is a Divisional Application of U.S. application Ser. No. 10/417,653 filed on Apr. 17, 2003, now U.S. Pat. No. 7,350,077 which claims the benefit of U.S. Provisional Application No. 60/429,714, filed Nov. 26, 2002 and claims the benefit of U.S. Provisional Application No. 60/439,419, filed Jan. 10, 2003.

TECHNICAL FIELD

This application is generally related to wireless networking, such as authenticating and provisioning wireless devices as the devices roam among access points.

BACKGROUND

Most current 802.11 network-level authentication protocols require a substantial amount of time to re-establish a wireless station's connectivity to the network after that station roams from one access point (AP) to another access point. Typically, when a station associates with a first access point, it has to be authenticated through a central authentication server. When the station roams to a new access point, the station loses the session to the network and again authenticates itself with the authentication server which typically involves a full challenge request and response. A new accounting session is then established. This delay in re-establishing connectivity greatly impacts 802.11 services to the point that some upper-level protocols, such as Voice-over-IP (VoIP), actually fail. Furthermore, each roam commonly necessitates interaction with a site's Authentication, Accounting, and Authorization (AAA) servers, resulting in a significant increase in server load, to the point at which some servers fail to provide the necessary rate of authentications requests for the 802.11 stations. More importantly, after the authentication has succeeded, the 802.11 station then uses the key provisioned at authentication to establish a fresh key used to secure the 802.11 link with the access point.

OVERVIEW OF EXAMPLE EMBODIMENTS

As it will be realized, the subject matter of this application is capable of other different embodiments and its several details are capable of modifications in various obvious aspects. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the example embodiments, and together with the description serve to explain the principles of the example embodiments

FIG. 2 is a table of Subnet Context Manager acquisition of network session keys.

FIG. 3 is a table illustrating authenticated key management selector values.

FIG. 4 is a table illustrating a Subnet Context Manager's cached credentials.

FIG. 5 is a table illustrating the credentials cached by an Access Point.

FIG. 6 is a block diagram illustrating the keys used to secure messages between links.

FIG. 7 is a flow diagram showing the steps for AP registration to an SCM.

FIG. 10 is a flow diagram illustrating the sequence triggered to complete a key establishment after a successful authentication.

FIG. 11 is an example key descriptor for a rekey sequence.

FIG. 13 is an example of the authenticating element included in a re-association request sent by a mobile node.

FIG. 14 is an example of the format of the response to the re-association request by the access point.

FIG. 18 is a table illustrating the format of a WLCCP Node ID.

FIG. 19 is block diagram showing the internal bridging structure in an access point.

FIG. 20 is an example of an Ethernet-encapsulated WLCCP Context Management frame.

FIG. 21 is an example of a WLCCP Message Header.

FIG. 22 is an example of a TLV format.

FIG. 23 is a block diagram showing how hopwise routing is used.

FIG. 24 is a block diagram illustrating a handoff from a first access point to a second access point for a mobile node on a campus topology.

DESCRIPTION OF EXAMPLE EMBODIMENTS

Figure 1:
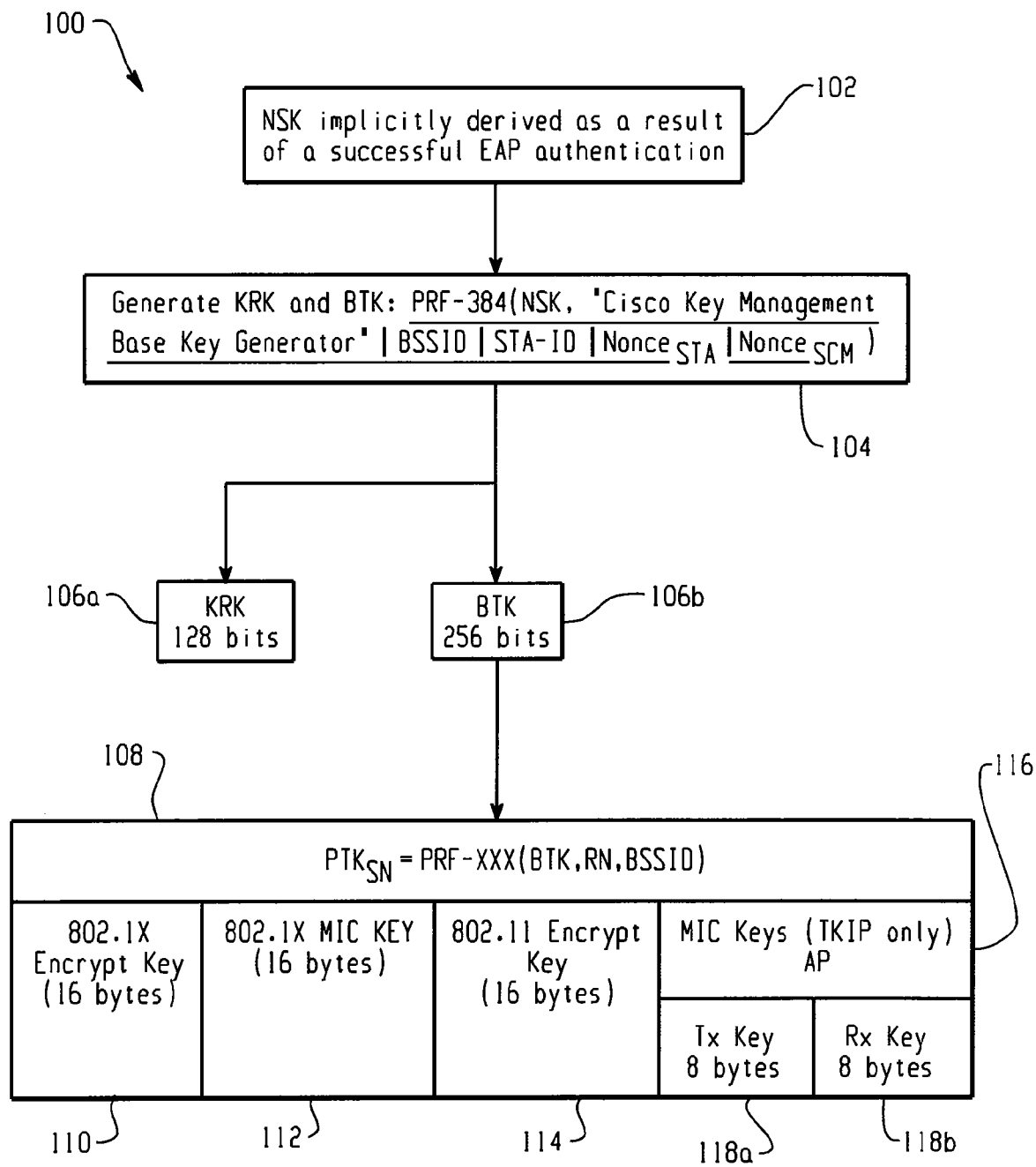
FIG. 1 is a block diagram illustrating a key hierarchy as contemplated by an example embodiment.

This description provides examples not intended to limit the scope of the invention, as claimed. The figures generally indicate the features of the examples, where it is understood and appreciated that like reference numerals are used to refer to like elements. The following is a list of acronyms and their corresponding definition as used throughout this specification:

AKM—Authenticated Key Management
AP—Access Point
AS—Authentication server
BSSID—Basic Service Set Identifier
BTK—Base Transient Key CCKM—Central Key Management
CCM—Campus Context Manager
CCX—Client Enablement
CTK—Context Transfer Key
GTK—Group Transient Key
KRK—Key Request Key
MN—Mobile Node
MN-ID—Mobile Node Identifier
NSK—network session key
PRF—PseudoRandom Function
PMK—Pairwise Master Key
PTK—pairwise transient key
RN—rekey request sequence number
SCM—Subnet Context Manager
SSID—Service Set Identifier
SSN—Simple Security Network
VLAN—Virtual Local Area Network
WLCCP—Wireless Local Context Control Protocol.

Along with the aforementioned acronyms, defined below is a definition of terms appearing throughout this application:

IEEE—Institute of Electrical and Electronics Engineers, Inc.

IEEE 802.11—The 802.11 protocol and 802.11 terms are defined in IEEE Std 802.11, 1999 Edition IEEE 802.11 TGi—a task group in IEEE 802.11 currently focused in addressing 802.11 security.

802 address. A canonical IEEE 48 bit "Ethernet" address. 802.11 and Ethernet addresses are 802 addresses.

802.11 bridge—An 802.11 bridge is a transparent bridge with an Ethernet bridge port and one or more 802.11 bridge ports. A parent 802.11 bridge has a secondary 802.11 port which links to a primary 802.11 port in a child 802.11 bridge.

802.11 station—A MN or AP.

802.1X—The IEEE 802.1X protocol. 802.1X defines a protocol where an 802.1X Supplicant mutually authenticates with an 802.1X Authenticator via an Authentication Server.

AAA—Authentication Authorization Accounting. A node will request network access by executing a protocol to a (typically) Authentication Server that provides protocols and services for providing authentication, authorization and session accounting.

AKM—Authenticated Key Management. New selector in both the SSN and TGi negotiated element present in beacons, probe response and reassociation request/response messages. This selector allows for definition of authentication type and key management.

AP—Access Point. In this document, "AP" is used as a general term to refer to any 802.11-to-Ethernet or 802.11-to-802.11 relay devices.

Association Message—An 802.11 station sends an Association Request message to initially associate with a parent AP. The parent AP replies with an Association Response message.

AS—Authentication Server. A node that provides AAA (specifically authentication) service.

BDPU—an 802.1D Bridge Protocol Data Unit.

BSS—An 802.11 Basic Service Set. A BSS is the set of 802.11 stations associated with a single 802.11 AP. A logical "BSS port" in an AP is used to access stations in the BSS.

Base Transient Key (BTK)—the base transient key that is mutually derived between MN and SCM to serve as the key for generating PTKs.

Campus Network—an aggregate "seamless roaming domain" which implies a geographic locality which may include one or more 802.11 Extended Service Sets. A physical campus network may contain multiple "campus networks."

Central Key Management (CCKM)—the key management scheme of the present invention. It utilizes a central node, an AP, as the key distributor to enable protected communications between a link (e.g. an AP and MN).

Context Transfer Key (CTK)—A key shared between two nodes to establish protection of its data packets. The CTK may consist of a pair of keys if the protection mechanism requires a unique key for each encryption and packet authentication (e.g. a MIC).

Correspondent Host (CH)—A mobile or non-mobile node that is actively communicating with a MN.

Descendant—A node that is in the sub tree of a Topology Tree that is roonated in an ancestor node.

DRR—Descendant Registration Record. A DRR contains state information for descendant nodes. An MN-DRR is a DRR for a mobile node. An AP-DRR is a DRR for an AP.

DPR—Descendant Path Record (DPR). A DPR contains path state information for descendant nodes.

Downlink—The logical radio path from an 802.11 AP radio to a child 802.11 station.

ESS—An 802.11 Extended Service Set. An ESS includes one or more BSSes and may span one or more subnets. MNs can roam between APs in the ESS. A SWAN Campus Network may include multiple ESSes.

FA—A Mobile Ipv4 foreign agent.

Group Transient Key (GTK)—A key owned and managed by an AP. It is used to protect multicast and broadcast traffic.

HA—A Mobile Ipv4 home agent.

Hopwise Routing—"Hopwise routing" is used when an inbound or outbound WLCCP message is forwarded to intermediate APs on the path from the Originator to the Responder.

IA—Infrastructure Node Authenticator. In standalone mode, the SCM is the IA; in a full SWAN configuration, the CCM is the IA.

IGMP—Internet Group Management Protocol. IGMP is used to determine IP multicast group membership.

IGMP Snooping—Switches and APs "snoop" IGMP messages, received on a port, to determine which IP multicast addresses is transmitted on the port.

Inbound—An "inbound frame" is forwarded toward the CCM, in the SWAN Topology Tree. An "inbound node" is accessed via the "primary port". (An "inbound node" is not necessarily an "ancestor node".)

IN—Infrastructure Node. An IN is an AP, SCM, LCM, or CCM.

IRR—Inbound Registration Record.

KDC—Key Distribution Center. This is a service provided by the IN Authenticator to distribute CTKs to be consumed by registered infrastructure nodes.

Key Request Key (KRK)—the portion of the expanded NSK used to authenticate key refresh request/response handshakes Layer 2—The data link layer, as defined in the ISO 7-layer model.

L-CTK—Lateral Context Transfer Key.

Link—the logical link between two immediate neighbors in the SWAN Topology tree.

Link State—Each SWAN node is responsible for monitoring the link to each of its immediate neighbors. The Link State can be "Connected" or "Disconnected".

MIP—Mobile IPv4 as defined in RFC 2002.

MN—802.11 Mobile Node.

MN-ID—802.11 Mobile Node identifier represented as the node's MAC address

Network Session Key (NSK)—the key established by a successful authentication between a node an its authenticator.

With the CCM being the authenticator for all infrastructure nodes and the LCM being the authenticator for all MNs. In the case where an SCM is acting in standalone mode, the SCM is the authenticator for all nodes.

MNR—Mobile Node Record. A Mobile Node Record contains state information for MNs.

Mobility bindings—The "mobility bindings" for a station are used to determine the current path to the station. APs, context managers, and MIP agents maintain mobility bindings for 802.11 stations.

MSC—Message Sequence Counter. This is effectively the RC4 IV and replay protector.

Native VLAN ID—A switch port and/or AP can be configured with a "native VLAN ID". Untagged or priority-tagged frames are implicitly associated with the native VLAN ID.

Network Access Identifier (NAI)—An NAI is used to identify a user within a network domain. For example, "joe@cisco.com" is a typical NAI.

NSK—Network Session Key. An NSK is the key established by a successful authentication between a node and its "authenticator". (The CCM is the authenticator for all infrastructure nodes and the LCM is the authenticator for all MNs, in a campus network. In a standalone subnet domain, the SCM is the authenticator for all nodes in the subnet.)

Originator—The node that "originates" a WLCCP "request" message.

Outbound—An "outbound frame" is forwarded away from the CCM, in the SWAN Topology Tree. An "outbound node" is a "descendant" node that is relatively further from the CCM in the SWAN Topology Tree.

OMNR—Outbound Mobile Node Record

Pairwise Master Key (PMK)—the key established by a successful authentication. This is the term used in both the TGi and SSN draft specification and is a key used to derive PTKs.

Pairwise Transient Key (PTK)—the key mutually derived by AP and MN and is a function of BTK and RN Path Authentication—Path authentication refers to the process where an AP or child CM mutually authenticates and establishes a path CTK with each of its ancestors. Path-Init and (optionally) initial Registration messages are used for path authentication.

Port—The logical entity that provides access to a SWAN Topology Tree "link". Multiple logical ports may exist on a single hardware interface.

PNR—Parent Node Record

Primary LAN—The wired Ethernet LAN directly attached to the SCM. Each subnet has one Primary Ethernet LAN. The primary LAN may include multiple Ethernet segments and wired transparent bridges/switches.

Primary Port—The port that is used to attach to the SWAN topology tree. In an SCM, it is the port that is used to access the parent LCM or CCM. In an AP, it is the port that is used to transmit frames toward the primary LAN. An AP primary port can be an Ethernet or 802.11 port. The AP primary port is the "default port" for unicast flooding purposes. [If an AP is co-located with an SCM, then a logical internal link exists between the AP and SCM. A logical AP "internal primary port" provides access to the SCM; however, the Ethernet port is still the "primary port" for frame forwarding purposes.]

PTK—Pairwise Transient Key. This key is used to protect 802.1X and 802.11 data packets between a MN and AP. PTKs are mutually derived by each node in the link based on a predefined strong pseudorandom function, BSSID, RN and BTK.

Reassociation Message—An 802.11 station sends an 802.11 Reassociation Request message to associate with a new parent AP after it roams. The parent AP replies with a Reassociation Response message.

Rekey Request Number (RN)—the counter used to protect PTK key refreshes from replay attacks. The counter is also used as part of the PTK key generator.

Repeater—A repeater is a "wireless AP" that is attached to a parent AP on an 802.11 primary port.

RN—Request Number. A sequence value used to rotate PTKs used between an authenticated MN and Root AP.

Root AP—A "root AP" is directly attached to the primary LAN on its primary Ethernet port.

Root CM—The CM that is at the root of the active SWAN Topology Tree. The CCM is the root CM in a campus network. The SCM is the root CM in a "stand-alone" subnet control domain.

Responder—The destination of a WLCCP Request message or the node that originates a WLCCP Reply message.

SARpM—SCM-Advertisement Reply Message

SCM—Subnet Context Manager. An SCM provides a central control point for each subnet. The SCM establishes the "primary LAN" for each subnet. From the perspective of a MN, a home SCM is the SCM of the home subnet for the MN and a foreign SCM is an SCM on any other "foreign subnet".

Seamless roaming. A MN is said to roam "seamlessly" if it roams between APs in different subnets without changing its "home IP address".

Secondary LAN—Any wired Ethernet LAN that is attached to the Primary Ethernet LAN by a wireless link. A secondary LAN may include multiple Ethernet segments and wired transparent bridges/switches.

Secondary Port—A secondary port is any active AP or CM port other than the primary port.

SSID—802.11 Service Set Identifier. Authentication parameters are defined globally per SSID. An SSID can be locally bound to a "home subnet" or VLAN, in each AP.

Simple Security Network (SSN)—Microsoft's specification for a framework used to provide 802.11 security. It mandates use of 802.1X EAP authentication, TKIP and Microsoft's 802.1X 4-way handshake for managing unicast keys and 802.1X 2-way handshake for managing broadcast and multicast keys.

STP—IEEE 802.1D Spanning Tree Protocol. An "STP AP" executes the 802.1D STP and the 802.1D STP is operated on an "STP link". A "non-STP AP" does not execute the 802.1D STP.

Subnet—An IP subnet. A MN is associated with a single "home subnet" at any given time. Any other subnet is a "foreign subnet", from the perspective of the MN.

Supplicant—The IEEE 802.1X standard defines the term "supplicant". A supplicant is a node that is mutually authenticating with an "802.1X authenticator" via an authentication server.

SWAN—Smart Wireless Architecture for Networking, an architecture for radio, network and mobility management within a secure environment.

SWAN Topology Tree—The logical structure of a SWAN network as determined by the SWAN parent/child relationships. The SWAN CCM is at the root of the topology tree.

VLAN—A "Virtual LAN", as defined in the IEEE 802.1Q standard.

TLV—Type, Length, Value "TLV's" contain optional parameters in WLCCP messages.

Uplink—The logical radio path from an 802.11 child station to its parent AP radio.

URR—Unbound Registration Record.

VLAN—A "Virtual LAN" as defined in the IEEE 802.1Q standard. VLAN tagged frames are transmitted on a VLAN Trunk link.

Wireless station—A MN, repeater, WGB, or child 802.11 bridge.

WGB—A work-group bridge is a non-STP AP with an 802.11 primary port and a secondary Ethernet port that provides access to a non-STP secondary Ethernet LAN segment.

WLAN—Wireless LAN.

WLCCP—Wireless LAN Context Control Protocol.

In addition to the aforementioned acronyms, unless otherwise defined herein acronyms from the 802.11 specification should be given their usual and customary meaning as defined by the 802.11 specification.

The example embodiments described herein reduce both message and computational burdens by employing a key hierarchy that decouples authentication session time from key management. Current 802.11 implementations tightly bind authentication and key management and enforce full backend (re)authentications because they are bound to the cipher suite selection. For WEP, this can result in very frequent (re)authentications due to WEPs rekey requirements. For roaming, current implementations also enforce a full (re)authentication.

The key hierarchy defines keys established on a successful authentication as network session keys (NSKs), which are independent of the 802.11 cipher suite selection. The NSK is used to generate a key refresh key (KRK) to authenticate key refresh requests and a base transient key (BTK) which serves as the base key from which pairwise transient keys (PTK) are derived.

Only PTKs are bound to the selected 802.11 cipher suite and thus are managed based on the cipher suite security policies. The longevity of the NSK is defined by the Authentication Server (AS) as a session timeout which can now be defined as a function of the NSK entropy versus the 802.11 negotiated cipher suite. The goal is to strongly encourage the use of authentication types that result in generation of dynamic NSK with more good entropy. A key hierarchy 100 is depicted in FIG. 1. Keys (as defined in FIG. 1) are managed by a centralized node that provides subnet context management (SCM). The SCM is the 802.1X authenticator for all MNs and Aps enforcing all MN nodes to implicitly register. The registration process ensures that all nodes in the registry have successfully associated, authenticated and have security credentials cached. The mechanisms described in this proposal are defined as Central Key Management (CCKM) and negotiated as a proprietary value in the Authenticated Key Management (AKM) information element as defined in current SSN and TGi's drafts.

Referring to FIG. 1, the top of the hierarchy 100 is the NSK 102. The NSK 102 is implicitly derived as a result of a successful EAP authentication. From the NSK 102 is generated the KRK and BTK as shown in block 104. The KRK and BTK are generated using a PRF with the NSK, BSSID, STA-ID, Nonce$_{STA}$ and Nonce$_{SCM}$ as parameters. The 128 bit KRK 106a and 256 bit BTK 106b are derived from the NSK. From the BTK 106b is generated the PTK$_{SN}$ using a PRF with the BTK, RN and BSSID as parameters. From the PTK are derived the 802.1X Encrypt Key 110 (16 bytes), the 802.1X MIC key 112 (16 bytes), the 802.11 Encrypt Key 114 (16 byes) and the AP MIC Keys 116 (TKIP only). The AP MIC Keys 116 further comprise a Tx Key 118a, 8 bytes, and a Rx Key 118b, also 8 bytes.

While the authentication mechanism remains unchanged, e.g. 802.1X EAP authentication, disclosed herein is a new key management scheme: CCKM. This new capability is advertised and negotiated using SSN's IE or RSN's IE, described herein infra.

An implementation consideration of an example embodiment is ensuring autonomy from authentication mechanisms. Like TGi and SSN, example embodiments herein also presume the presence of a (NSK) key upon successful authentication. For security reasons, this key should in general be dynamically configured and managed. An example embodiment provisions for short NSK's and provides a means to stretch them to the required 384 bit length. This design can also allow for the use of pre-shared keys to be defined as the NSKs.

The CCKM is aware of the authentication type used to interpret and retrieve the NSK. FIG. 2 is a table 200 that describes how the NSK is derived and retrieved by the SCM. Column 202 describes the 802.1X Authentication type. Column 204 describes the NSK computation. Column 206 shows the length of the NSK in bytes, and column 208 describes how the SCM acquires the NSK.

Authentication types that do not mutually derive dynamic keys, such as EAP-MD5 rely on having a static key to be configured similar to how legacy systems support pre-shared key authentication. These static configurations are traditionally managed at the AP. To allow for backward compatibility, these configurations persist. Thus, CCKM will request these NSK types from the first associated AP as the session NSK.

Example embodiments disclosed herein contemplate a fast handoff system and method (herein referred to as CCKM) that is based on a centralized service, a Subnet Context Manager (SCM) to enable a seamless secure context transfer required to transition a MN from one AP to a new one. To secure such transfers, the SCM relies on each node both APs and MNs to mutually authenticate with the SCM. Upon successful authentication, a shared secret is established: a network session key (NSK).

The use of the NSK deviates from IEEE 802.11 TGi's (as well as SSN) use of the key established at authentication. TGi/SSN refers to this key as a PMK which in turn is used as key material to derive both the 802.1X and 802.11 pairwise transient keys (PTKs). While CCKM also derives further key material from the NSK, the derived keys are used to authenticate transient key requests and to derive the PTKs. The key hierarchy is depicted in FIG. 1.

By defining a key rotation scheme, CCKM allows the MN to derive the new PTK before reassociation. The MN may derive the PTK for the new AP once it determines the new BSSID it is roaming to and before the reassociation request is transmitted. Thus, upon a reassociation request, the MN can be ready to protect unicast communications to the new AP but awaits the AP's reassociation response as acknowledgement that both parties can now secure unicast communications. The AP's reassociation response also includes delivery of the broadcast keys (GTK) to enable full protected communications.

For general PTK rekeying, CCKM introduces EAPOL key descriptor enhancements similar to those defined in SSN/TGi to affect a CCKM rekey.

Using either SSN or TGi's information elements, SSN IE and RSN IE respectively, CCKM capabilities can be negotiated. Currently both specifications allow the negotiation for an authenticated key management suite. The suite selector encapsulates both an authentication and a key management mechanism. The assigned values are described in table 300 in FIG. 3. Column 302 is the Organization Unique Identifier (OUI), column 304 is the type corresponding to the OUI in column 302, and column 306 is the description for the OUI in column 302.

Both AP and MN support CCKM for interoperability. The AP advertises CCKM capability by using a new value in the Authenticated Key Management Suite Selector as defined in SSN v 0.21 and TGi draft 2.3.

CCKM capability is advertised in beacons and negotiated during probe response and association request. Successful negotiation of CCKM enables the centralized key management defined in this specification. Enabling CCKM also implies activation of the The SCM is designed to provide context control for a subnet and affect client context transfers upon a roam. The SCM is a module that can coexist in an AP, be a standalone server, or coexist in an AS. While the SCM is designed to affect full inter-subnet mobility, this design only employs the components required to affect intra-subnet mobility. These elements include:

- a repository holding authenticated node's security credentials including the node's NSK, session timeout and security policy
- an MN's security credentials include an NSK, SSID, VLAN, session timeout, associated BSSID and possibly also authentication mechanism, key management mechanism and cipher suite negotiated at association. The credentials are used to validate the session before a context transfer and PTK can be delivered.
- an AP's security credentials include an NSK, session timeout and list of associated MNs
- a context repository including security credentials for all registered nodes
- services required to manage the context repository for registered MNs and APs
- services to identify and enable the SCM as the Authenticator for all APs and MNs
- SCM provides services to automatically provide the new AP with the MNs security credentials without client interaction
- services to generate and secure delivery of PTKs based on security policy.

The SCM maintains a cache of all registered MN contexts within a given subnet including the MNs' NSKs (shown in FIG. 4). The cached credentials for an AP are slightly different and are described in FIG. 5. Referring to FIG. 4, column 402 lists the SCAM cache of MN credentials, comprising the fields State 408, STA Addr 410, Authentication type 412, Key Management Type 414, Session Timeout 416, KRK 418, BTK 420, RN 422, SSID 424, VLAN ID 426, BSSID 428, Cipher 430, NSK Key length 432, NSK 434, Tx Key Length 436 and Tx Key 438. The length in bytes and a description of these fields are provided in columns 404 and 406 respectively. Referring to FIG. 5, the AP's cached credentials comprise the state 508, Node-ID 510, NSK 512, Session Timeout 514, CTK 516 and key sequence counter 518 as shown in column 502. The length and description of these fields are provided in columns 504 and 506 respectively.

The SCM establishes shared secrets with both the MN and APs. It uses the Key Request Key (KRK) as the shared secret with MNs to authenticate key requests. The Context Transfer Key (CTK) is the shared secret with APs to protect communications between the SCM and AP. The trust relationship is depicted in FIG. 6.

CTKs are distributed by the SCM to the AP for protecting link communications. Note that while it has been suggested that NSKs be used to protect AP to SCM communications, this would enforce a shorter session timeout and full reauthentications to the AS when link keys need updating.

FIG. 6 shows the keys used to protect communication between assigned links. Note that BTKs are not used to protect messages directly, rather, it is used to derive PTKs used to protect communications between AP and MN. As shown in FIG. 6, the AS 602 uses NSK0 606 to communicate with the SCM 604. The SCM 604 communicates with AP! 608 and AP2 610 using keys CTK1 612 and CTK2 614 respectively. AP1 608 communicates with MN3 616 and MN4 618 using PTK3 622 and PTK4 624 respectively, while AP2 610 communicates with MN5 with PTK5 628. The SCM 604 may also directly communicate with the mobile nodes, MN3 616, MN4 618 and MN5 620 using KRK6 630, KRK7 632 and KRK8 634 respectively.

PTKs are derived and refreshed based on a Rekey sequence counter and BTKs as defined or refreshed based on the NSK as described herein infra.

By employing SCM capabilities described herein, the fast handoff design provides a scalable infrastructure that is required to provide inter-subnet roaming in a subsequent release.

The SCM services coexist in any AP and thus an election mechanism may be defined to allow for the selection of an AP as the SCM provider.

While there will be no initial support for SCM to SCM (e.g. lateral) communication to enable warm restarts, the election mechanism still enables cold standby.

To secure communications with MNs, the AP first authenticates and registers with its SCM. Authentication is required to establish an NSK and registration allows secure communications between the SCM and the AP. The AP's NSK is derived by the AP as a result of a successful 802.1X LEAP authentication with the SCM; the authentication server delivers the NSK to the SCM via the Radius MS-MPPE attribute also as a result of a successful authentication. The AP identifies its SCM by listening to the SCM advertisement messages.

Upon successful authentication with the SCM, the AP registers itself with the SCM as a valid AP. Upon pre-registration, the SCM delivers a set of CTKs to the AP that is used to both encrypt and authenticate WLCCP messages between the SCM and the AP.

A message depiction of how an AP establishes the required NSK and CTKs is shown in FIG. 7. The AP also establishes the CTK to ensure that no rogue AP is introduced and compromise either NSK or CTK. The authentication mechanism is similar to that used for bridges, where the configure LEAP username and password are used to authenticate with the AS. Tasks performed by the AP are in column 702, tasks performed by the SCM are listed in column 704, and tasks performed by the AS are in column 704.

For some embodiments, the SCM is the 802.1X Authenticator for all nodes. Thus, CTK establishment between the AP and SCM is mutually derived.

To secure communications, a MN authenticates with the network via 802.1X EAP authentication. The result of a successful authentication establishes a NSK that is used to establish the KRK and BTK used to respectively authenticate key refreshes and derive PTKs.

Figure 8A:
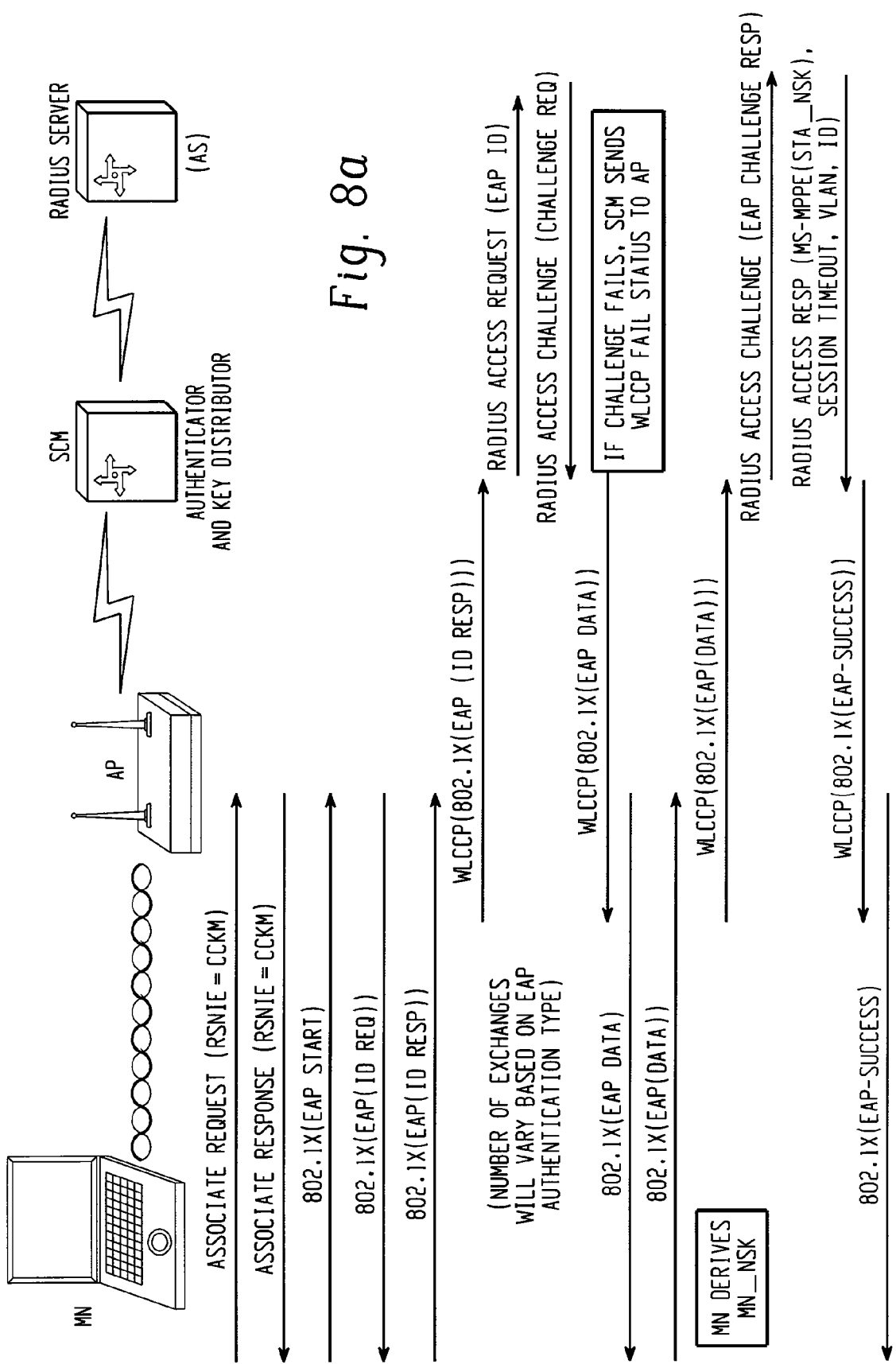
FIG. 8 shows an example of a successful mobile node Lightweight Extensible Authentication Protocol Authentication and Registration.
Figure 8B:
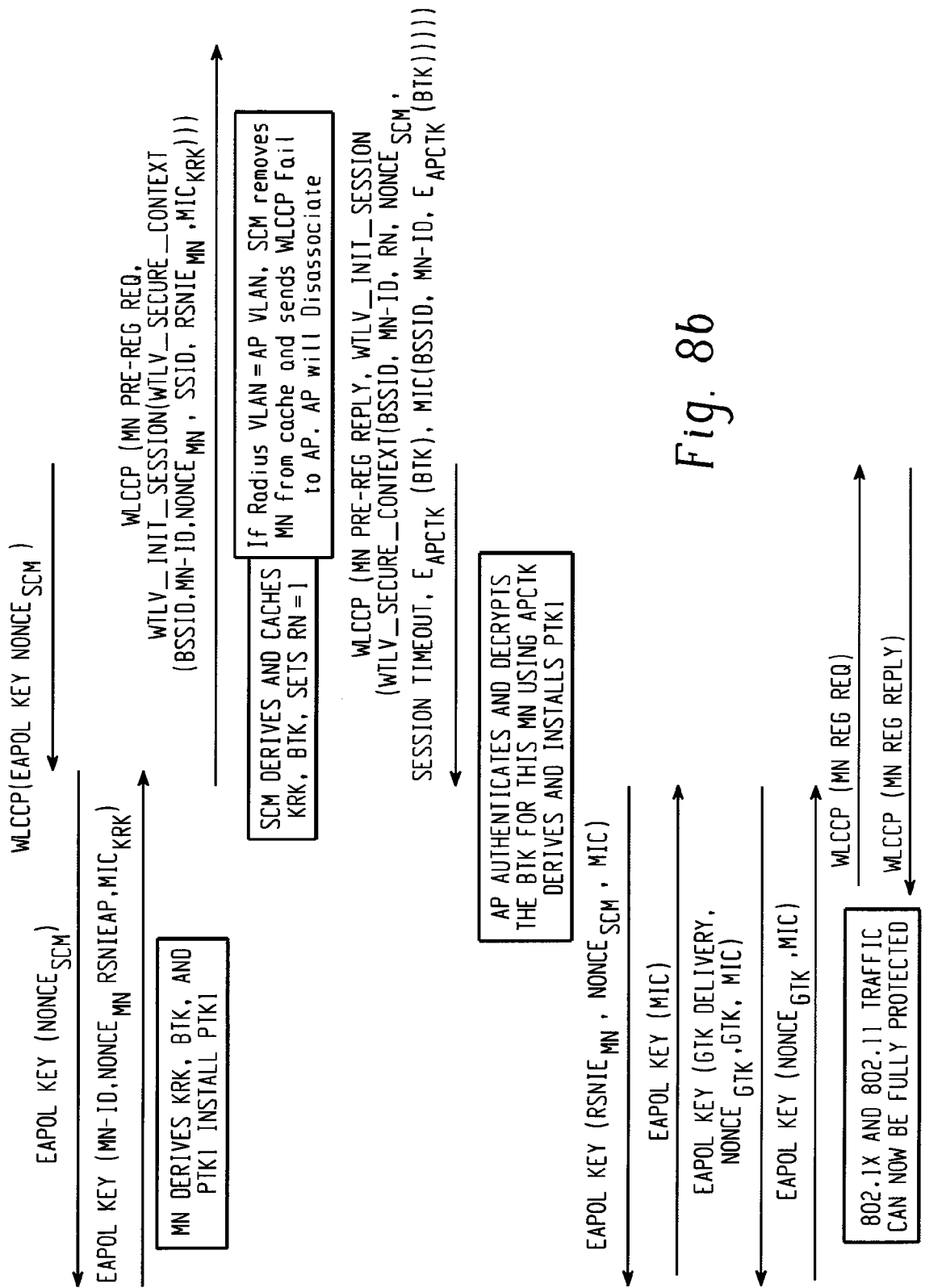
Figure 9A:
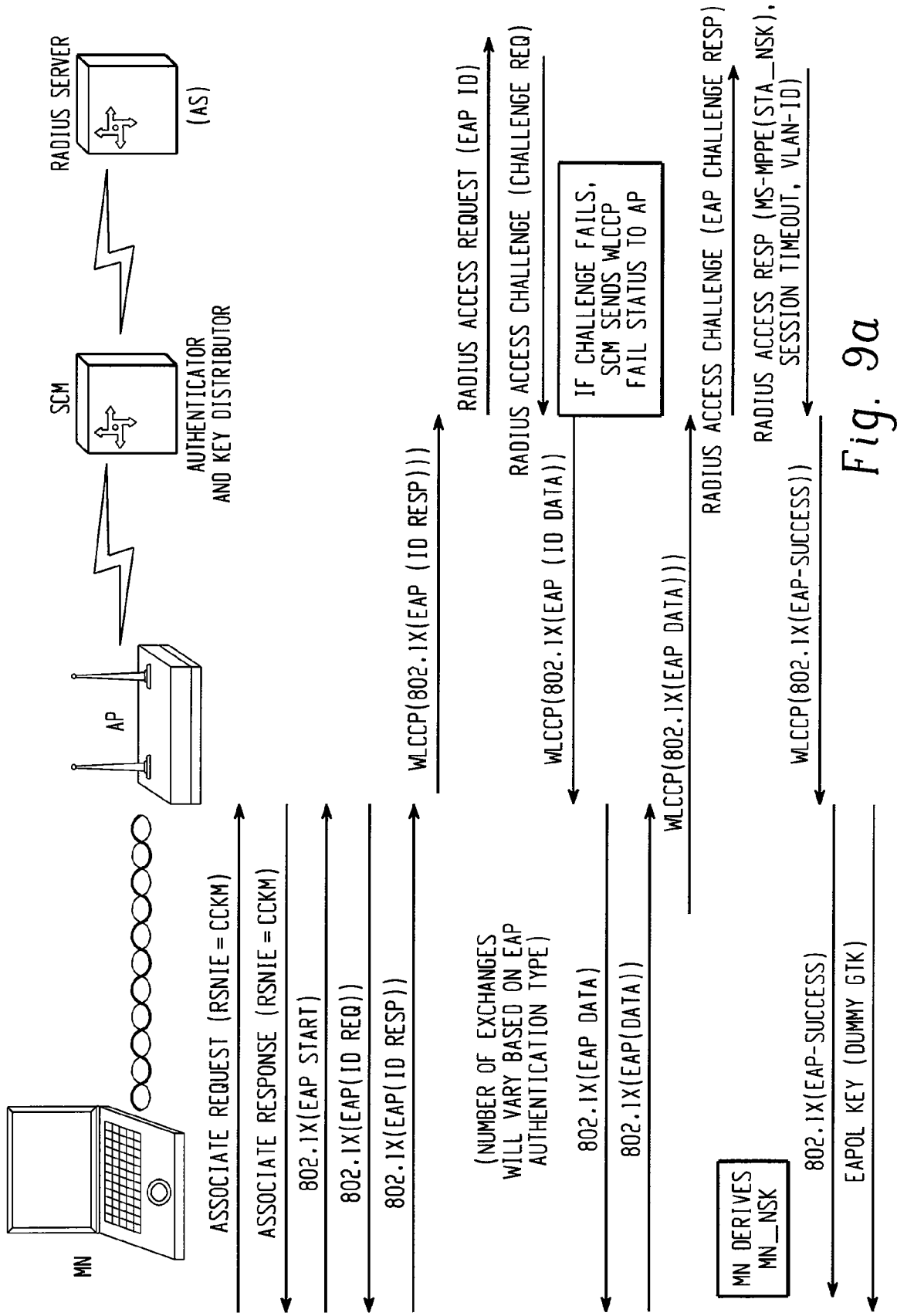
FIG. 9 shows an example of a successful mobile node non-Lightweight Extensible Authentication Protocol authentication and registration.
Figure 9B:
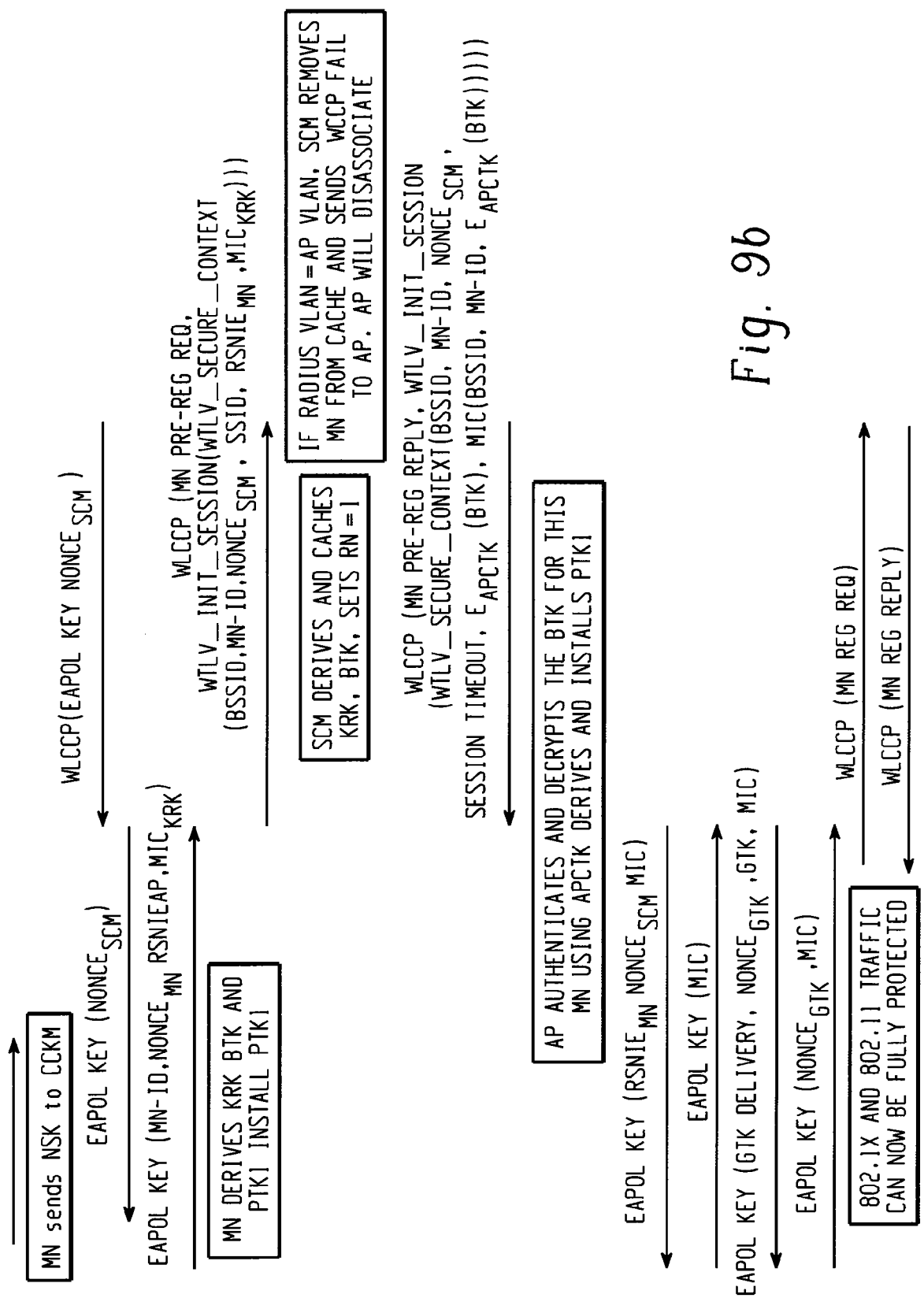

Like SSN, CCKM also initiates a session with a 4-way handshake to establish the KRK and BTK, for enabling protection of unicast traffic These handshakes are only required after successful authentication. Rekey requests either upon re-association or due to general key management rekeying (like cipher suite countermeasures) only require an authenticated 3-way handshake. FIG. 8, depicts a successful MN LEAP Authentication and registration with the SCM. FIG. 9 shows an example of a successful mobile node non-Lightweight Extensible Authentication Protocol authentication and registration.

A mechanism is needed to pass the NSK from EAP supplicants which are independent of the CCKM module. For instance, for non-LEAP EAP authentication on Windows platforms, the MN's NSK is usually generated in the EAP supplicant and passed to the EAP framework. The EAP framework will then pass the NSK to the CCKM module. Since the current SSN-capable EAP framework treats CCKM as non-SSN compliant, it will just process the 802.1X EAP authentication and send down the NSK after an EAP authentication success. Similarly, non-SSN EAP supplicants will simply process the 802.1X EAP authentication and send down the NSK after an EAP authentication success.

However, it is likely that the NSK will not be delivered until after the group key delivery EAPOL Key message from the AP is received. Thus, as shown in FIG. 8, for non-LEAP EAP authentication, the AP needs to send an additional 802.1X EAPOL key message with a dummy group key right after sending an EAP-Success message to the station.

It is up to the implementation in the CCKM module to indicate to the AP that it needs to send an additional EAPOL key message. This information could be negotiated during the association request RSNIE. An alternate solution is to send the dummy EAPOL key message after EAP Success message. The CCKM module can ignore the dummy key if it already has the NSK and establish the real keys post the four-way handshake.

However, for legacy systems, association exchanges will trigger a full authentication and 4-way handshake. Receipt of the CCKM rekey elements will be ignored.

An additional 2-way handshake is used to rekey the multicast/broadcast keys (GTK). The rekey protocol for GTK management is the same as specified in TGi and SSN. The 2-message handshake is initiated by the AP to deliver the GTK over and encrypted EAPOL Key message. The current PTK is used to protect these EAPOL Key messages.

In a CCKM capable system, an AP will request the SCM for security credentials during a pre-registration request/reply. Associations imply session initiation and thus, upon an association if security credentials are valid in an SCM and CCKM is negotiated established. If no security credentials exist, then the AP expects full authentication between MN and AS.

After a successful authentication, the sequence shown in FIG. 10 is triggered to complete the key establishment and result in the necessary PTKs used to protect packets between AP and MN.

Since the AP is also provided with the MN's session timeout, policy for managing (re)authentications is assigned to the AP. Similar to current implementations, APs can trigger (re)authentications before the session timeout expires and can also manage the update of the KRK and BTK refreshment as defined herein.

Either MN or AP can trigger a PTK rekey. Conditions in which either node may request a rekey include: TKIP failures, particularly in Michael countermeasures; Exhaustion of IV (mainly for WEP) and Countermeasures if the node feels the PTK has been compromised.

The rekey exchange is a 3-message EAPOL Key handshake. A new key descriptor is defined to allow for a secure rekey exchange, which is shown in FIG. 11. The fields are defined as follows:

Key Information 1102: designates whether it is a request (0), response (1) or confirm (3);

Status 1104: is used by the responder and confirmer. A zero value means success; non-zero means the rekey failed and either a full KRK, BTK or deauthentication is invoked;

EAPOL Replay Counter 1106: is the EAPOL Key message counter also used to protect from message replays;

Reserved field 1108: an extra byte is added to better align the element;

Key-ID 1110: 1 byte field that stored the key identifier (0, 1, 2 or 3) assignment, it matches the currently assigned key ID;

MN-ID 1112: the client's MAC address;

BSSID 1114: the AP's MAC address;

RN 1116: the rekey request number;

MIC 1118: authentication element using the current PTK. The MIC is defined as:

$$MIC_{request} = \text{HMAC-MD5}(\text{PTK},$$
$$\text{Key Info} \| \text{EAPOL Replay Ctr} \| \text{Key ID} \| \text{MN-ID} \|$$
$$\text{Key Info} \| \text{EAPOL Replay Ctr} \| \text{Key ID} \| \text{MN-ID} \|$$
$$\text{BSSID} \| \text{RN}),$$
$$MIC_{response} = \text{HMAC-MD5}(\text{PTK},$$
$$\text{Key Info} \| \text{EAPOL Replay Ctr} \| \text{Key ID} \| \text{MN-ID} \| \text{BSSID} \|$$
$$\text{RN} \| \text{Status}),$$
$$MIC_{confirm} = \text{HMAC-MD5}(\text{PTK},$$
$$\text{Key Info} \| \text{EAPOL Replay Ctr} \| \text{Key ID} \| \text{MN-ID} \| \text{BSSID} \|$$
$$\text{RN} \| \text{Status}).$$

Figure 12:
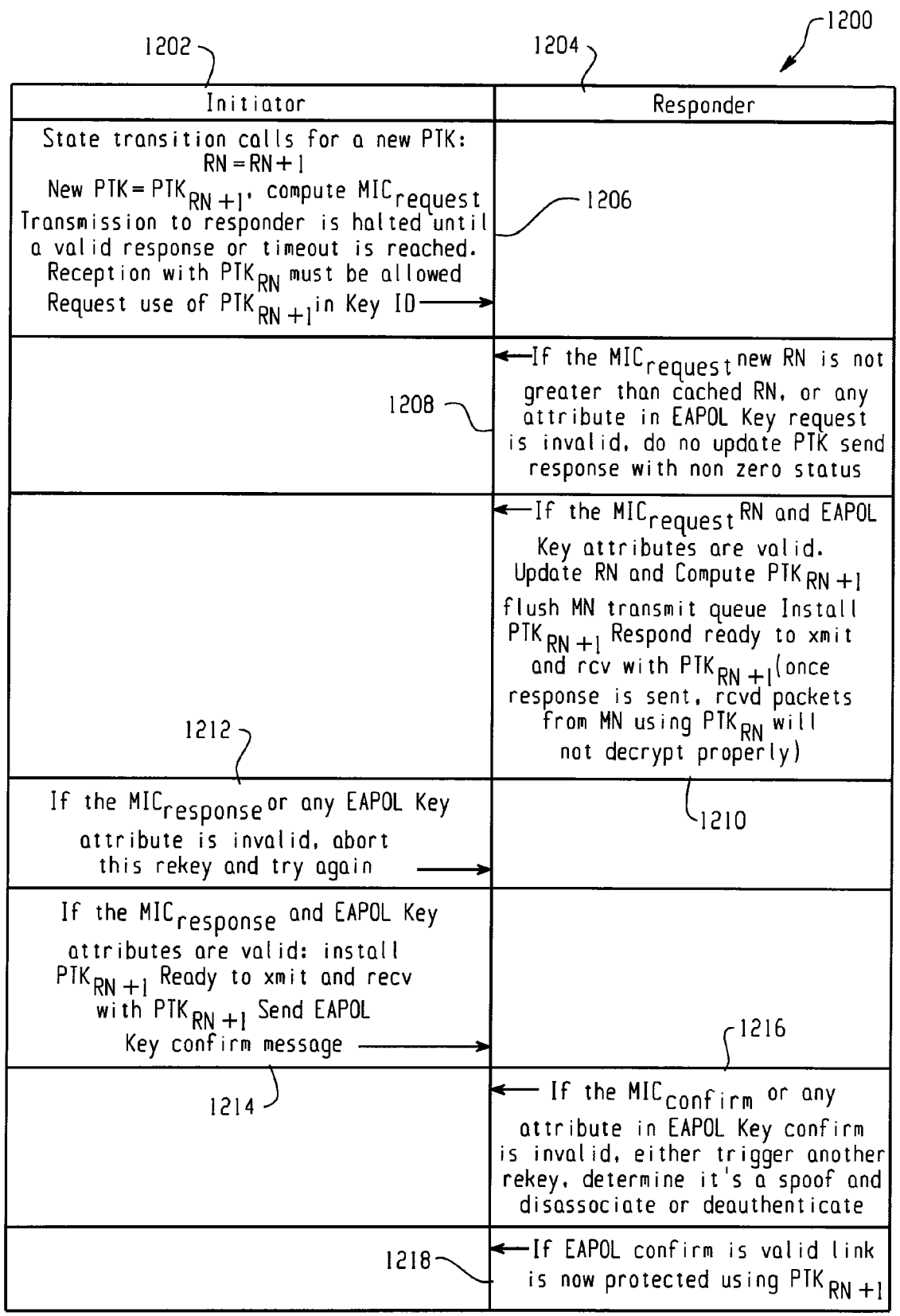
FIG. 12 is a block diagram showing a rekey sequence.

The rekey sequence 1200 is shown in FIG. 12. The left column 1202 shows tasks performed by the initiator while the right column 1204 shows tasks performed by the responder.

At block 1206 the State transition calls for a new PTK. The initiator sets RN=RN+1, the new PTK=$PTK_{RN+1}$, and the compute $MIC_{request}$. Transmission to responder is halted until a valid response or timeout is reached. Reception with $PTK_{RN}$ is allowed. Request use of $PTK_{RN+1}$ in Key ID is sent.

The responder receives the request. If as shown at block 1208 the $MIC_{request}$, new RN is not greater than cached RN, or any attribute in EAPOL Key request is invalid, the responder does not update PTK or send a response with non zero status. However, if as shown at block 1210 the $MIC_{request}$ RN and EAPOL Key attributes are valid, the responder will update RN and compute $PTK_{RN+1}$, flush MN transmit queue, install $PTK_{RN+1}$, and respond ready to xmit and rcv with $PTK_{RN+1}$ (once response is sent, rcvd packets from MN using $PTK_{RN}$ will not decrypt properly).

The initiator then receives the responder's response. As shown in block 1212, if the $MIC_{response}$ or any EAPOL Key attribute is invalid, the rekey is aborted and the initiator will try again. However, if as shown at block 1204 the $MIC_{response}$ and EAPOL Key attributes are valid, then the initiator installs $PTK_{RN+1}$ and is ready to xmit and rcv with $PTK_{RN+1}$. The initiator then sends an EAPOL Key confirm message.

The responder then receives the EAPOL confirm message. As shown in block 1216, if the $MIC_{confirm}$ or any attribute in EAPOL Key confirm is invalid, the responder will either trigger another rekey, determine it's a spoof and disassociate or deauthenticate. As shown in block 1218, if EAPOL confirm is valid, the link is now protected using $PTK_{RN+1}$ On a successful rekey, the AP synchronizes the SCM's RN value for the MN. It is recommended that the synchronization be made at every rekey. To update the SCM, a WLCCP_CONTEXT message with a WTLV_UPDATE_RN is sent to the SCM.

The description above assumes that neither request nor responder is capable of using multiple Key IDs to buffer PTKs. However, the protocol of particular embodiments described herein allows for this function and thus facilitate a smoother transition during a rekey operation. That is, the requester can install $PTK_{RN+1}$ into a new KeyID and thus enable reception of packets under either $PTK_{RN}$ or $PTK_{RN+1}$. Similarly, the responder could plumb the key in the alternate specified Key ID and also allow transmission and reception under either key. The final confirmation is to halt transmission and reception under the current (old) $PTK_{RN}$.

CCKM uses the SSN and TGi style of rekeying for updating multicast (GTK) keys and is thus not defined in this specification. For details on group/broadcast key updates refer to the latest TGi draft.

To shorten the re-association handshake, this design minimizes the number of packets exchanged between the client station and the AP to two packets—re-association request and re-association response. Referring to FIG. 13, a new proprietary element 1300 is introduced to facilitate the handoff in the re-association messages. The element in the re-association request includes the rekey request number (RN) and an authenticated element. Where:

$MIC_{MN}$ 1314=HMAC-MD5(KRK, MN-ID∥BSSID∥$RSNIE_{MN}$∥Timestamp∥RN), and

Element ID 1302 is a Cisco defined element whose value is 0x9c

Length 1304 should be the length of the CCKM element request (e.g. 24 bytes)

OUI 1306 should be 00:40:96

OUI 1308 Type should be 0

MN-ID (not shown) is the MN's MAC address,

BSSID (not shown) is the AP's MAC address,

Timestamp 1310 is the current TSF timer value,

RN 1312 is the rekey request number, $RSNIE_{MN}$ (not shown) is the MN's requesting security policy (e.g. AKM and cipher suite negotiation);

CCKM (now shown) is specified in the AKM selector of $RSNIE_{MN}$

The re-association response includes a new element authenticating 1400 the request, confirming use of $PTK_{RN}$ and delivering the multicast key as shown in FIG. 14. Where:

---

EGTK = RC4(RN ∥ $PTK_{RN}$, GTK)
$MIC_{AP}$ 1402 = HMAC-MD5($PTK_{RN}$, MN-ID ∥ $RSNIE_{AP}$ ∥
RN ∥ $KeyID_{unicast}$ ∥ $KeyID_{multicast}$
∥ Key length ∥ EGTK)

---

Figure 15:
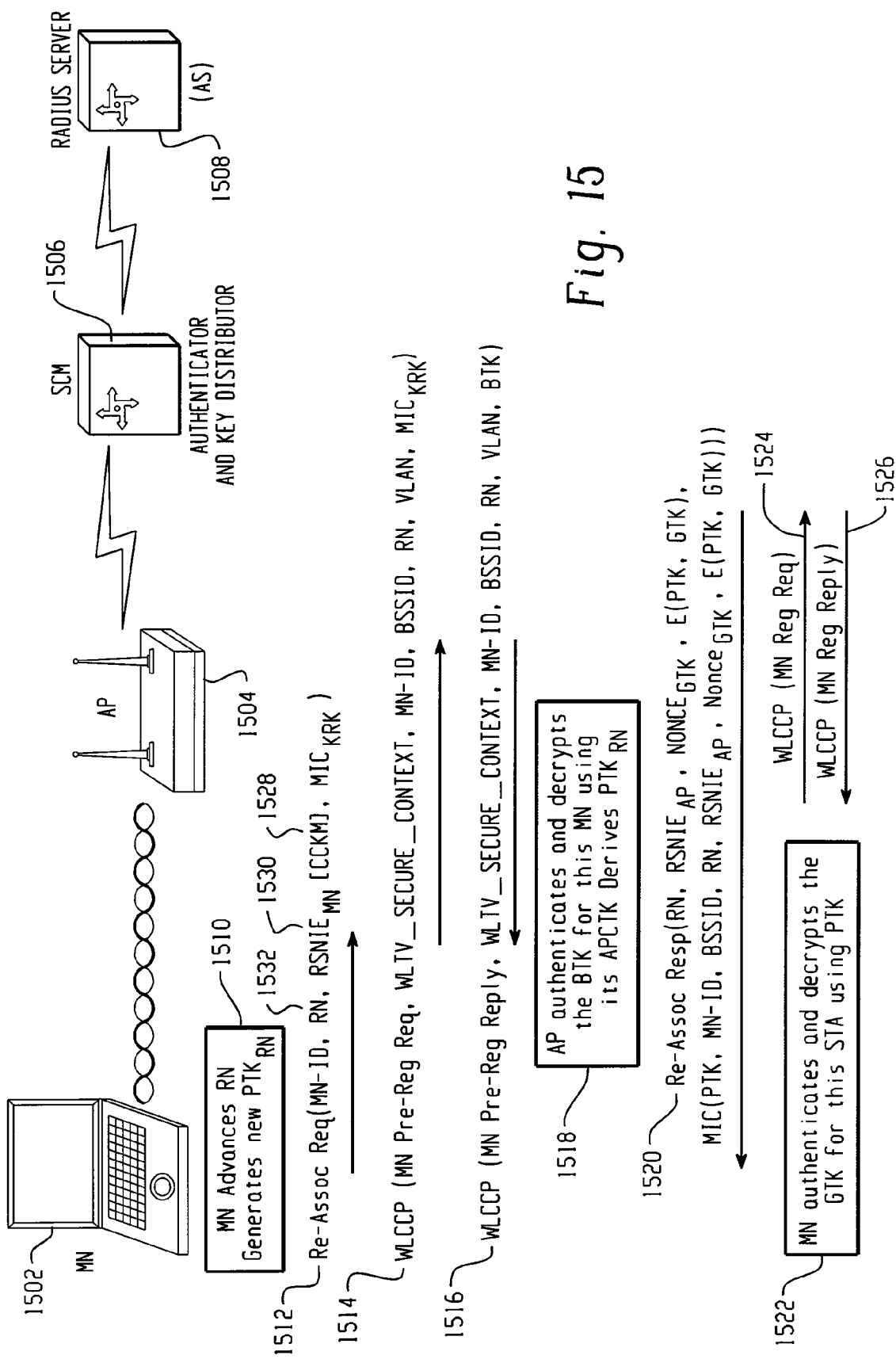
FIG. 15 is a block diagram illustrating the communications that take place between the various network components for a successful mobile node reassociation to a new access point.

Referring now to FIG. 15, there is shown an example of a successful MN reassociation to a new AP. The handoff occurs in the re-associate request/response exchange. The MN 1502 includes CCKM 1528 in the RSNIE 1530 to employ the fast handoff. More importantly, the security policy negotiated by the MN 1502 at reassociation matches the one specified at initial association. The SCM 1506 validates that the requesting RN 1532 value is greater than the previous one. The timestamp provided in the request is within a configurable value of the AP's TSF timer (not shown); the timestamp is included to ensure that this request is fresh. On a response, the AP 1504 also provides it's TSF timer value in the CCKM response element to assure the MN 1502 that the response is also fresh.

When the AP 1504 receives a re-association request and CCKM is negotiated, it queries the SCM 1506 for validation of security credentials and acquires the RN and BTK before it can generate $PTK_{RN}$. The request is made using a WTLV_SECURE_CONTEXT request to the SCM 1506. If the SCM 1506 cannot validate credentials, then it will not deliver anything and provide a non-zero status indicating failure. On a successful transfer, the SCM 1506 will deliver the RN and BTK in an encrypted and authenticated WTLV_SECURE_CONTEXT reply. The validation of security credentials prevents an insider from fast reassociation with a different SSID.

On a successful context transfer, the AP 1504 proceeds to generate the PTK as described herein infra. It will then use the PTK to encrypt and authenticate the new information element to affirm PTK and securely deliver the multicast key, GTK.

If CCKM is negotiated but no proprietary element is provided, the AP 1504 can still request for security credentials. If credentials are valid then a full WTLV_INIT_SESSION establishment of fresh KRK and BTK is triggered and upon a successful 4-way exchange, KRK and BTK are mutually derived by SCM 1506 and MN 1502 and RN is reset to 1. If there are no credentials or the request to the SCM fails, the AP may choose to enforce a full (re)authentication.

By utilizing a sequence of PTK the client station is ready to decrypt unicast packets before the client initiates the re-association request. The client confirms its identity in the re-association request by using an incrementing authenticator (request number) and corresponding authentication (MIC). The AP 1504 uses the re-association response to confirm its identity and to piggyback the multicast key information (GTK) to the client STA.

For each fast re-association attempt, a unique request number (RN) will be used. On each fast re-association attempt, the client will increment the RN. The SCM prevents replay of a fast re-association request by caching the last RN used by the client, and rejecting any request for which the RN is less than or equal to the cached last RN.

Note that the derivation of the credentials and keying information includes the BSSID to prevent replay attempts across different APs. For example, without the BSSID, a hacker could attempt to reuse a fast-reassociation request for one AP to associate to a second AP. Which attempt will reach the SCM first—the hacker or the true client—depends on the delays through the network.

In another embodiment, there may be included the ability to forward security credentials to registered APs. For networks with large latency between the AP 1504 and the SCM 1506, the SCM 1506 information can also be cached at the AP 1504. In this case, the AP 1504 could perform all of the calculations that would normally be done at the SCM 1506. The AP 1504 can verify the authentication of a client, without having to query the SCM 1506 to obtain the latest RN, as the last RN used for a particular BSSID is sufficient to prevent replay. The AP 1504 should send an update to the SCM 1506 to ensure that the SCM 1506 has the latest RN information—this is particularly important if the AP should stale the information and request the information from the SCM later.

The process for the reassociation starts at 1510 wherein a MN 1502 advances RN and generates a new $PTK_{RN}$. As shown at 1512, the MN 1502 sends the Re-Assoc Request to the AP 1512 which includes RN 1532, $RSNIE_{MN}$ 1530 with CCKM 1528 as the negotiated key management value. The AP 1504 then sends a WLCCP(MN, Pre-Reg Req, WTLV_SECURE_CONTEXT, MN-ID, BSSID, RN, VLAN, $MIC_{KRK}$) to the SCM 1506 as shown by 1514. The SCM 1506 responds with WLCCP(MN Pre-Req Reply, WTLV_SECURE_CONTEXT, MN-ID, BSSID, RN, VLAN, BTK) as shown by 1516. As shown in block 1518, the AP 1504 authenticates and decrypts the BTK for the MN 1502 using it's AP's CTK and derives $PTK_{RN}$. At 1520, the AP 1504 sends Re-Assoc Resp(RN, $RSNIE_{AP}$ $Nonce_{GTK}$ E(PTK, GTK), MIC(PTK, MN-ID, BSSID, RN, RSNIEAP, $Nonce_{GTK}$, E(PTK,GTK)) which completes the liveness of $PTK_{RN}$ and delivery of the GTK. Then as shown in block 1522 the MN 1502 authenticates and decrypts the GTK for this STA using PTK. Once the AP 1504 has completed the establishment of a secure communication link with the MN 1502, it registers the MN 1502 as being active with the AP 1504. This is accomplished by steps 1524 and 1526. At step 1524 a WLCCP(MN, REg Req) is sent from AP 1504 to SCM 1506 and the reply is sent at step 1526 as WLCCP(MN Reg Reply).

Figure 16A:
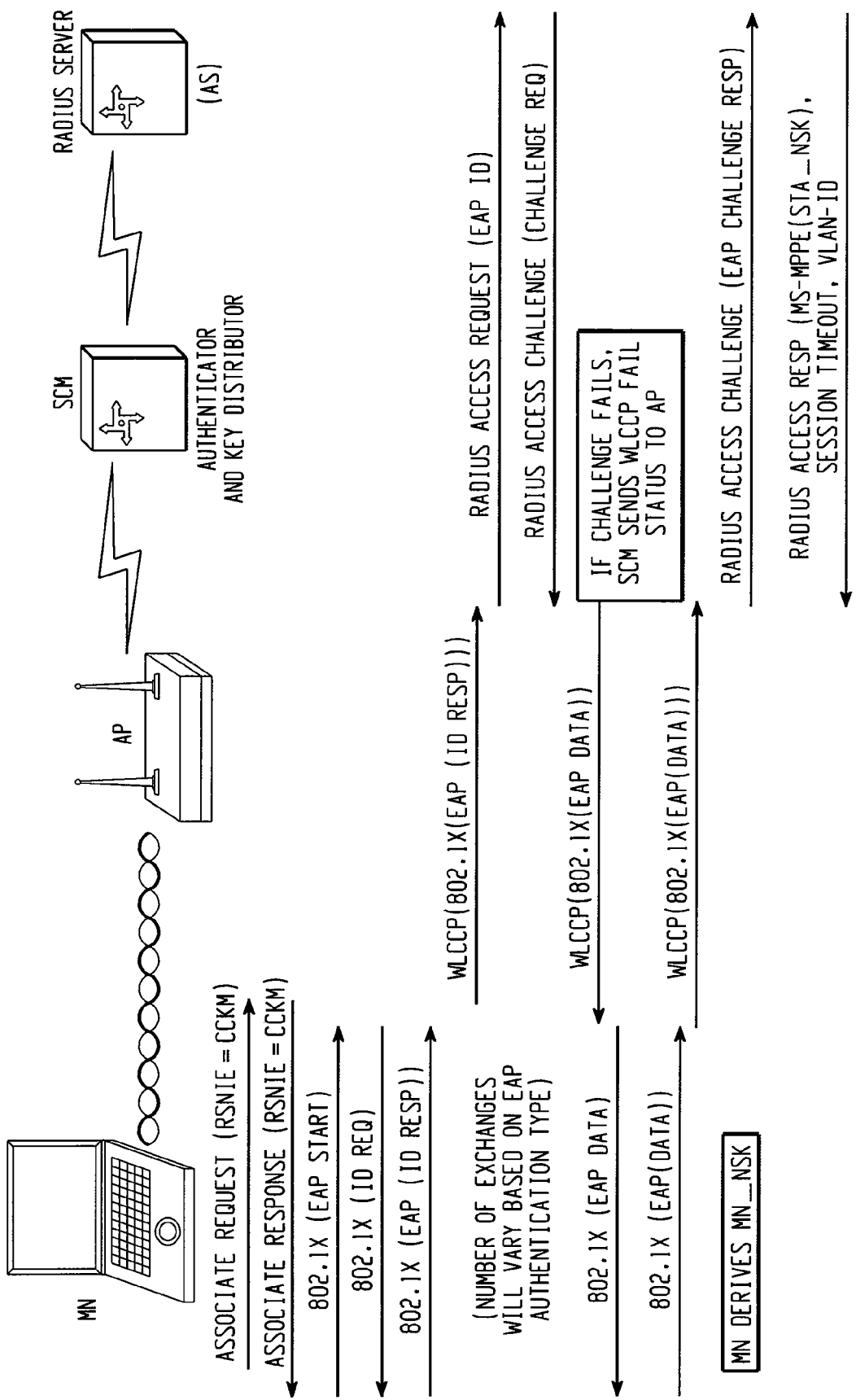
FIG. 16 is a block diagram showing a method for propagating keys for legacy or SSN mobile nodes.
Figure 16B:
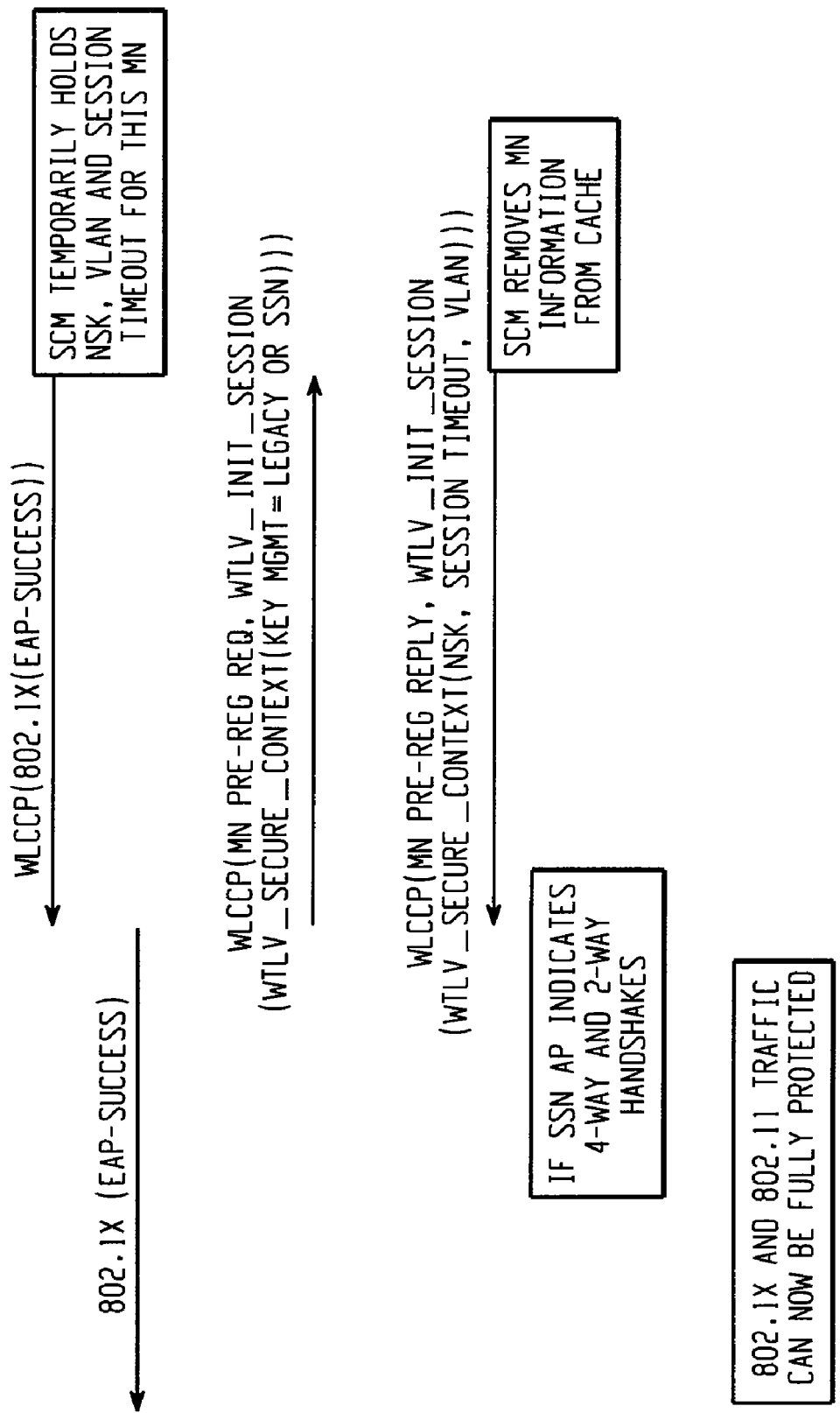

While this design promotes the use of CCKM, other Authenticated Key Management (AKM) types can be supported. Since CCKM-capable MNs are the only MN types that have their credentials cached at the SCM and thus require registration. However, in order to properly propagate credentials to the AP, all MNs are pre-registered. Whether supporting a legacy or SSN-capable client the credential propagation and pre-registration is the same, as shown in FIG. 16.

A key hierarchy is defined to allow for stretching keys as well as derivation of fresh keys. This section describes the functions used to derive the keys. A comment is made though, to address the issue of key entropy.

CCKM ensures key freshness but relies on the provisioning of strong keys; e.g. having good entropy. If implementations like LEAP which are password based are believed to have low entropy then further crypto tools can be used to improve the key's entropy. TGi has already adopted a variation of PKCS#5 as a means of improving key entropy which this design can easily adopt. Note however, that this requires far more computation that some NICs can provide.

KRK and BTK Derivation:

To ensure fresh KRK and BTK keys, the AP and MN engage in a 4-way handshake to provide key material required for deriving KRK and BTK. Each node provides 16 byte nonces that are subsequently used with the NSK to derive the required keys. The function is defined as follows:

$GK = PRF\text{-}384(NSK, \text{"Cisco Key Management Base Key Generator"} \mid BSSID \mid STA\text{-}ID \mid Nonce_{STA} \mid Nonce_{SCM})$
$KRK = GK[0:127]$
$BTK = GK[128:383]$
PRF-384 is defined in Section 0.

Since the same PRF-XXX function is used to generate multiple key types, the string "Cisco's Key Management Base Key Generator" is introduced to this key derivation function to ensure that these keys are uniquely constructed from other key types.

Securing WLCCP Messages: p To protect WLCCP messages from eavesdropping and man-in-the-middle attacks, most WLCCP messages are encrypted using RC4 and authenticated using HMAC-MD5. An AP establishes a CTK with the SCM during pre-registration so that it can commence protection of WLCCP messages.

The CTK is a 256 bit key that is used to protect WLCCP messages as follows:
  The low order 128 bits of CTK is used as the RC4 key.
  The high order 128 bits of CTK is used as the HMAC-MD5 key CTK Key Derivation:

Context transfer keys used between the AP and SCM are generated and distributed by the SCM. Each node in the link provides a 16 byte nonce to assure a fresh key:

$CTK = PRF\text{-}256(NSK, \text{"SWAN IN - IA link Context Transfer Key Derivation"} \mid AP\text{-}ID \mid SCM\text{-}ID \mid Nonce_{AP} \mid Nonce_{SCM} \mid KSC)$ The CTK is computed by the SCM and delivered to the AP for protecting subsequent WLCCP messages. Delivery of the CTK is done by encrypting and authenticating the key using the NSK.

PTK Key Derivation

PTKs are a maximum of 512 bytes as they are used to protect both 802.1X and 802.11 communications. Its length is dependent on the 802.11 cipher suite negotiation established at association. PTKs are derived by use of a one way hash function: SHA-1 and is based on the BTK, RN and BSSID:

$PTK = PRF\text{-}Len(BTK, RN \mid BSSID)$
  where Len = 384 for WRAP or CCMP, 512 for TKIP or CKIP While this application uses the term PTK liberally, the PTK generated is partitioned into several keys used to protect the following (also shown in FIG. 1):
  EAPOL Key encryption between the AP and MN
  EAPOL Key authentication between the AP and MN
  802.11 encryption
  For 802.11 TKIP and CKIP: data packet authentication between the AP and MN The key assignment for PTK is as follows:

| | |
|---|---|
| EAPOL-Key MIC Key | = PTK[0:127] |
| EAPOL-Key ENC Key | = PTK[128:255] |
| 802.11 Encrypt Key | = PTK[256:383] |
| TKIP Michael Authenticator Tx Key | = PTK[384:447] |
| TKIP Michael Authenticator Rx Key | = PTK[448:511] |

In addition to the aforementioned embodiments, another aspect of an example embodiment described herein is a Wireless LAN Context Control Protocol (WLCCP) that is used to establish and manage a network topology, referred to herein as the Smart Wireless Architecture for Networking (SWAN), and it is used to securely manage the "operational context" for mobile stations in a SWAN "campus network".

A WLCCP registration protocol a) automatically creates and deletes links in the SWAN topology, b) securely distributes operational context, and c) (optionally) reliably establishes Layer 2 forwarding paths on wireless links.

A WLCCP SCM advertisement/election protocol automatically establishes a single SCM as the central control point for each subnet, and enables APs and MNs to select the parent node that provides the "least-cost path" to a backbone LAN.

WLCCP "Context" messages provide a general-purpose transport for context and management information. WLCCP "Trace" messages facilitate network diagnostic tools.

WLCCP is a transaction-oriented "request/reply" protocol. All WLCCP request and reply messages have a fixed-length header that contains message-type-dependent fields. Optional Type-Length-Value pairs follow the fixed length header; therefore, WLCCP is extensible.

Ethernet or UDP/IP encapsulation can be used for WLCCP messages. Ethernet encapsulation is restricted to intra-subnet (e.g. AP-to-AP or AP-to-SCM) WLCCP messages. IP encapsulation is used for inter-subnet WLCCP messages and may also be used for intra-subnet WLCCP messages. As those skilled in the art can readily appreciate, a specific WLCCP implementation may not include all of the components described herein.

A "distributed" context transfer protocol can be used to directly transfer context from an "old AP" to a "new AP", when a MN roams. The IEEE 802.11f draft protocol, for example, defines a distributed context transfer protocol. There are a number of inherent problems with such a distributed approach. The most notable problems are: 1) Secure context transfer requires a many-to-many trust relationship between APs (or requires some additional hierarchy). 2) A protocol is needed to enable the "new AP" to determine the "old AP" when a MN roams. (The "old AP" 802.11 Reassociation field is not sufficient.) Context is passed around from AP to AP as a station roams; therefore, critical context may be lost (e.g. if the link to an old AP is lost). 4) A distributed protocol is susceptible to an inherent race condition where "handoff messages" for rapidly roaming stations may arrive out-of-order.

The SWAN network disclosed herein is organized as a hierarchical "Topology Tree". When a station roams from an "old AP" to a "new AP", context is generally transferred via the "nearest common ancestor", in the Topology Tree, of both the old and new APs. WLCCP registration includes the necessary routing logic to automatically find the nearest common ancestor. Cached configuration and context information is stored in the network infrastructure. The common ancestor securely forwards the cached information on the new Topology Tree branch for a station that has roamed. Therefore, context transfer is automatically "localized" and context information is not lost if the link to an old AP is lost. The common ancestor also forwards the "old AP bindings" to the new AP.

A many-to-many security relationship between 802.11 APs is not needed for secure context transfer in a SWAN network. Instead, a trust hierarchy is established that corresponds to the SWAN Topology Tree. Operational context is generally forwarded on Topology Tree branches; therefore, WLCCP context transfer keys are pre-established between all SWAN nodes on the same topology tree branch. If it necessary to transfer context "laterally" between 2 nodes on different topology tree branches, then the nearest common ancestor of the 2 nodes can function as a trusted third party to quickly establish mutual authentication and a transient context transfer key.

The hierarchical Topology Tree facilitates central management and control points. For example, network-wide parameters can be centrally configured and distributed. A central WLCCP control point establishes and deletes topology links; therefore, it is possible to maintain a consistent network topology even if hand-off messages for rapidly roaming stations arrive out-of-order.

A locally or globally administered 48-bit IEEE 802 address is used as an internal WLCCP network Node Address. An IP address is not used as a Node Address because: a) A node may change its IP address. b) WLCCP is used to manage Layer 2 mobility; it should generally be independent of any network layer protocol.

A WLCCP Node Address is an internal WLCCP node identifier and should not be used to identify APs and CMs to users in network management applications. Instead, a Network Access Identifier (NAI) or domain name can be used as a user WLCCP node identifier.

Subnet topology components described herein are specific to the WLCCP implementation. An example subnet topology for an implementation that supports Layer 2 path updates and wireless bridges will be illustrated herein infra.

SWAN CMs and APs are interior nodes (INs) and MNs and secondary Ethernet Nodes (ENs) are leaves in the SWAN Topology Tree. The SWAN CCM 1702 is at the root of the campus Topology Tree. The CCM 1702 is the root CM, in a campus network. An LCM 1704, 1706 is at the root of the sub tree contained in a Local Control Domain. An SCM 1708, 1710, 1712 is at the root of the sub tree contained in each network subnet. A "parent AP" 1722, 1724, 1726 and 1728 is at the root of a sub tree that contains child MNs 1730, 1732 and 1734 and any child Aps 1736 and 1738.

The format of a WLCCP Node ID is shown in table 1800 of FIG. 18. A 64-bit WLCCP Node ID identifies each node in a SWAN network. A Node ID is a concatenated 16-bit WLCCP Node Type 1802 and a 48-bit WLCCP Node Address 1804. The Node Address 1804 for a MN, EN, AP, or SCM is a global 48-bit IEEE 802 address. The Node Address 1804 for an LCM or CCM can be a global or locally-administered 48-bit IEEE 802 address. It is contemplated in one embodiment, the CCM can automatically assign "local" 48-bit addresses to itself and other LCMs. A Node Address of 'all zeros' is used to identify the "local WLCCP node" in a WLCCP CM or AP. The Node Type is CCM, LCM, SCM, AP, MN, or EN.

Each physical AP (e.g. Ethernet and 802.11) communications interface is identified by a 48-bit IEEE 802 port address. An SCM's LAN communications interface is also identified by a 48-bit IEEE 802 port address. An 802 port address can be re-used as the WLCCP Node Address. Each WLCCP CM has an IP communications interface, which is identified by an IP port address. An IP port address is not used as a CM node address because a CM's IP address may change.

AP communications interfaces generally operate in "promiscuous mode"; therefore, an AP can receive WLCCP frames destined to its Node Address on any physical interface. In a simple implementation, the AP Node Address can be used to identify an "internal WLCCP interface" in an AP.

FIG. 19 shows the internal bridging structure in an AP. The Ethernet 802 port address is also the WLCCP Node Address. A frame, which is destined to the Node Address and received on either the Ethernet or 802.11 interface, is "bridged" internally to the WLCCP protocol interface; therefore, the Node Address can also be used as the WLCCP "Hop Address" on any AP port. [WLCCP and DDP are shown together because they share the same Ethernet DIX type.]

Each WLCCP AP and CM should be configured with a permanent "node name" [e.g. Network Access Identifier (NAI) or a DNS domain name]. An LCM is configured with a node name to request a locally administered Node Address from the CCM.

A Node ID is not a permanent node identifier and should not be used as such. An NAI can be used to represent network nodes to users.

An Instance Identifier and its Node ID identify each "instance" of an "Attached" AP or CM. In WLCCP, an Instance Age is used as the instance identifier, as described below.

Each WLCCP CM maintains cross-referenced tables that are used to map a WLCCP Node ID to a node name or IP address, or vice-versa.

Figure 17:
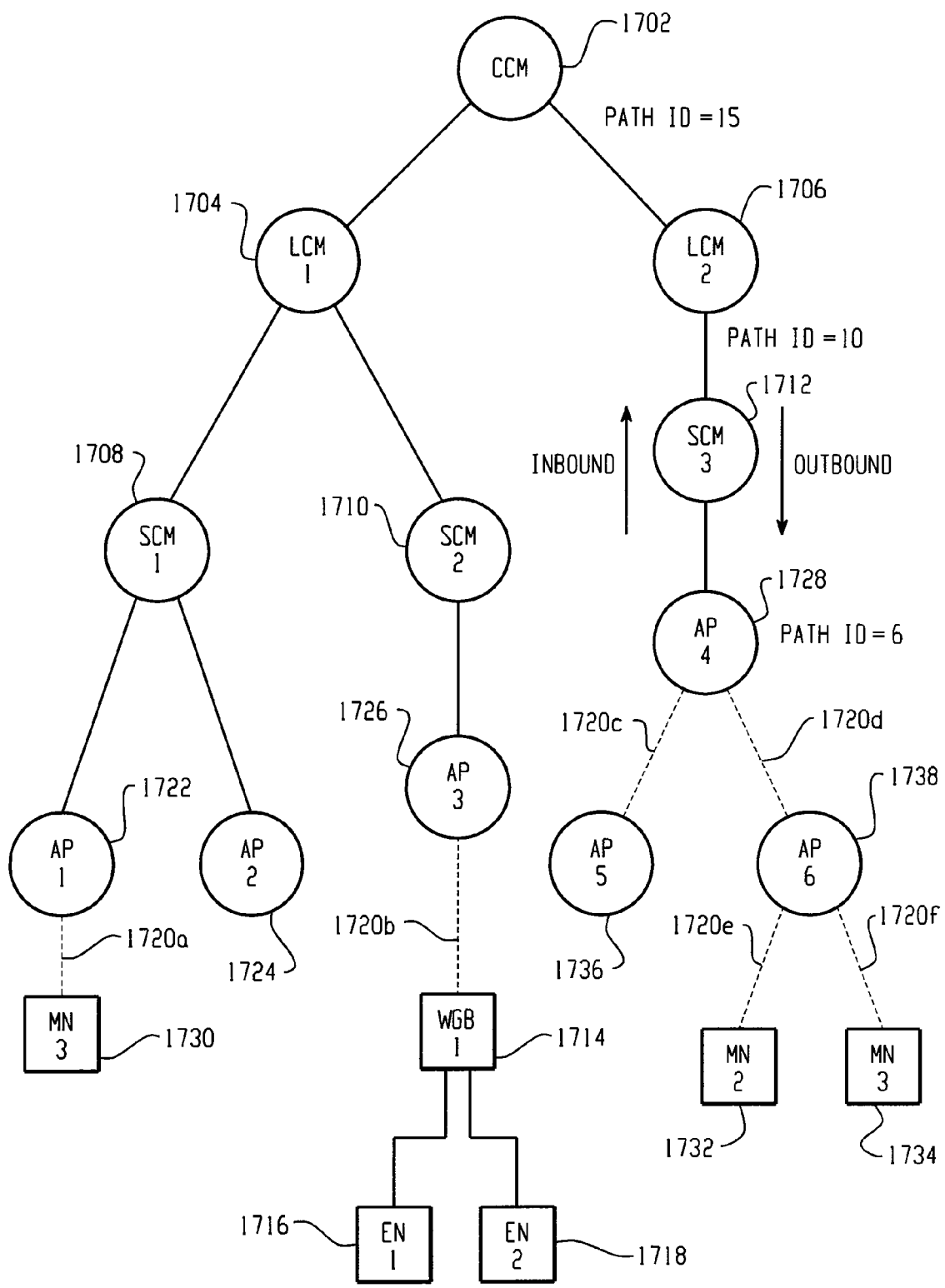
FIG. 17 is a block diagram exemplifying a topology tree for a full implementation of an example embodiment.

Referring again to FIG. 17, in a campus network, each SWAN AP 1722, 1724, 1726, and 1728 CM 1704, 1706, 1708, 1710, 1712 other than the SWAN CCM 1702, is bound to a single "parent node" and to a single "parent CM". The parent CM for an LCM is the CCM. The parent CM for an SCM is an LCM. [Note that a single device may include multiple logical CMs. The device that contains the CCM contains a logical LCM.] In FIG. 17, the parent node and parent CM, for AP 1720, are AP 1728 and SCM 1712, respectively.

The SCM for each subnet is the parent CM for all APs on its subnet and for all MNs that are associated with those APs. Note that a MN is a child of the SCM for the parent AP's "native" subnet even if the MN is bound to a different "home subnet" via VLAN trunking or Proxy MIP tunneling. For example, in FIG. 17, SCM 1708, AP 1722 and AP 1724 all belong to the same subnet. MN 1730 is a child of AP 1722; therefore, it is a child of SCM 1708. However, MN 1730 may belong to a different subnet if AP-1 is attached on a VLAN trunk link.

The "parent node" for an LCM or SCM is the parent CM. The parent node for a MN is the 802.11 parent AP. The parent node for a "root AP" is an SCM. The parent node for a non-root AP is the 802.11 parent AP. A node is considered a "child" of its parent. A "neighbor" is a parent or child node.

A logical "link" exists between a node and each of its neighbors. A "port" is the logical entity that provides access to a link. Each CM and AP has a single primary port and one or more secondary ports. A node attaches to the network on its primary port. Multiple logical ports may exist on top of a single physical communications interface. For example, in FIG. 17, AP 1728 may use the same physical 802.11 interface to access the link to AP 1736 and AP 1738; however, AP 1728 has a separate logical port for each link.

A "branch" of the Topology Tree is comprised of a set of nodes and links that provide the shortest path between an "ancestor" node and a "descendant" node. An inbound node is an ancestor and an outbound node is a descendant. All nodes are descendants of the root CM 1702. An outbound path originates from an ancestor node and terminates at a descendant node. An inbound path originates at a descendant node.

SWAN CMs are NOT in the forwarding path for non-WLCCP messages; therefore, a node's SWAN "path instance" is NOT the same as the node's data forwarding path.

A Topology Tree "link" exists between each SWAN node and each of its neighbors. A link is established when a "child node" selects a "parent node" and registers with the SWAN infrastructure via its parent node. An SCM-to-AP link is an Ethernet link. An AP-to-AP link can be an Ethernet or 802.11 link. An AP-to-MN link is (currently) an 802.11 link. A CM-to-CM link can, conceptually, be any link that supports IP.

A node is responsible for maintaining the "link state" for each of its neighbors. An active link is in a "connected" state. A link transitions to a "disconnected" state if the underlying physical communications link is lost or if a child roams to a different parent node. A node is able to detect link state changes in its neighbors; otherwise, links may exist in a "half-connected" state. [AP-to-AP 802.11 link state is transparent to WLCCP implementations where WLCCP is not used for Layer 2 path updates.]

The CCM's IP address or domain name is statically configured in each LCM and in each SCM candidate. It is contemplated that in one embodiment an LCM or SCM can automatically discover the CCM, via a CCM Advertisement Protocol.

The list of subnets that are bound to each LCM is configured in the CCM. An SCM sends a request message to the CCM, initially and whenever any parent LCM is lost, to obtain its parent LCM assignment.

An SCM is automatically elected for each subnet. An AP automatically discovers its parent SCM, via an SCM Advertisement Protocol. A non-root "child AP" is also bound to a "parent AP", as described below. A MN is bound to a parent AP via the 802.11 association protocol.

A node is either in an "Attached" or "Unattached" state. A node is initially in the Unattached state. A CCM candidate transitions to the Attached state when it becomes the active CCM. A CCM transitions to the Unattached state when it relinquishes the CCM role. A non-CCM node transitions to the Attached state when it initially registers with the SWAN infrastructure. An Attached non-CCM node transitions to the Unattached state if a) it detects that is parent node is unattached, or b) it is unable to communicate with its parent node.

Each CM maintains an internal Instance Age that contains the elapsed time, in seconds, since the node last transitioned to the Attached state. The Instance Age is initialized to 0 and is reset to 0 each time the node initially registers with a new parent CM. The Instance Age of an SCM is copied into the Instance Age field in SCM-Advertisement Reply messages, so that a child AP can detect a new instance of its parent SCM. A child AP becomes Unattached if it receives an advertisement message with a lower Instance Age. In one embodiment, an AP does not need to maintain an Instance Age if WLCCP is not used for Layer 2 path updates.

A SWAN network generally operates in "campus infrastructure mode" with a single CCM and corresponding Campus Control Domain. An LCM and its corresponding Local Control Domain operates in "local stand-alone mode" if the LCM cannot communicate with the CCM. An LCM also operates in stand-alone mode if it is not assigned to a CCM. Likewise, each SCM and corresponding subnet operates in "subnet stand-alone mode", if the SCM is not assigned to a parent LCM.

In stand-alone mode, a Local Control Domain or Subnet Control Domain operates much like a SWAN campus network. An LCM operating in local stand-alone mode assumes CCM functions. The LCM or SCM at the root of a stand-alone domain functions as the 802.1X authenticator for both infrastructure nodes and MNs. A Local or Subnet Control Domain is able to transition smoothly between infrastructure mode and stand-alone mode.

An LCM is configured with the IP address of the CCM, to operate in infrastructure mode. If an LCM is operating in stand-alone mode because it lost the link to its assigned CCM, then it periodically attempt to re-establish communications with the CCM.

An SCM is configured with the IP address or domain name of the CCM, to operate in infrastructure mode. The CCM is responsible for assigning each SCM to an LCM, as described below in the section entitled "W2—Parent LCM Assignment".

An AP operates in a fallback "distributed mode" if it cannot discover an SCM for its subnet. An AP is able to transition smoothly between infrastructure mode and distributed mode. For example, an AP can use the existing Cisco Datagram Delivery Protocol in distributed mode. Note that a user can force APs to operate in distributed mode by simply not configuring any SCM candidates.

In general, an LCM or SCM can transition smoothly from infrastructure mode to stand-alone (i.e. when the link to its parent is lost) mode without disconnecting nodes in its sub tree. Nodes in a "new" stand-alone domain can continue to use existing registration information and security credentials, which were previously established in infrastructure mode.

The sub tree rooted at an LCM or SCM is rebuilt when the LCM or SCM transitions from stand-alone mode to infrastructure mode. An SCM or LCM establishes a new Instance ID when it transitions from stand-alone to infrastructure mode. An SCM also establishes a new Instance ID if its parent LCM changes. The sub tree rooted at the SCM or LCM is automatically deleted as nodes in the sub tree detect the new SCM or LCM instance.

WLCCP "Context Management" message types are listed below. A "request" and "reply" subtype is defined for each message type. An optional "confirm" and "ack" subtype is defined for select message types that require additional handshaking.

SCM-Advertisement
CCM-Advertisement
Registration
Preregistration
Deregistration
Detach
Context
Path-Update
Path-Check
Trace
AAA
Path-Init WLCCP message formats are defined in the section entitled "WLCCP Protocol Definitions".

A "Response-Req" Flag is set ON in a Request message to solicit a Reply message. In general, a reply message is used to acknowledge a request message and to return status and/or context information to the Originator. A request "message identifier" is copied into the corresponding reply message to "match" request/reply pairs. The same message identifier is used in retransmitted request messages, to identify all request/reply messages that belong to a single transaction.

An optional "Confirm" message can be used to acknowledge a Reply message and return status and/or context information to the Responder. The Response-Req Flag is set ON in a Reply message to solicit a Confirm message.

An optional "Ack" message can be used to acknowledge a Confirm message and return status and/or context information to the Originator. The Response-Req Flag is set ON in a Confirm message to solicit an Ack message.

WLCCP messages contained a fixed-length header, followed by optional, variable-length TLVs.

An SCM sends periodic SCM-Advertisement-Reply messages to advertise network parameters and availability and to facilitate the SCM election protocol, on each AP "native" subnet. APs automatically discover the active SCM for the local subnet by monitoring SCM advertisements. APs receive SCM advertisements on a "primary port" and forward SCM advertisements on "secondary ports" to propagate SCM and subnet information to descendent nodes in the SWAN topology.

A node can send an SCM-Advertisement-Request message to solicit an SCM-Advertisement-Reply message (e.g. to shorten the discovery period).

A CCM can, optionally, send periodic CCM-Advertisement-Reply messages to advertise network parameters and availability and to facilitate a CCM election protocol. LCMs and SCMs can automatically discover the active CCM by monitoring CCM advertisements. CCM-Advertisement Request and Reply messages are sent to an IP multicast address.

A node can send a CCM-Advertisement-Request message to solicit a CCM-Advertisement-Reply message.

A Registration-Request message is used to request registration for a MN, AP, or CM with the SWAN infrastructure. A SWAN node is registered with the CCM and each LCM, SCM, and AP on the path to the CCM. A Registration-Request is forwarded inbound on a single branch in the SWAN topology. There are two Registration Request types: An "initial" Registration Request is generated to establish a new Path Instance. An "update" Registration Request is used to refresh a Path Instance and to update cached dynamic context information.

A CM returns a Registration-Reply to acknowledge receipt of a registration request, establish a "path instance", and to return context information, including any "old mobility bindings". Registration-Reply messages establish the Layer 2 forwarding path on wireless links. A Registration-Reply is forwarded outbound on the reverse path of the corresponding request.

Preregistration Request and Preregistration Reply messages are used to obtain security credentials and establish the authentication state for an 802.11 MN or child AP prior to registration.

A CM sends a Deregistration-Request message to request deletion an old path instance when a station roams. A Deregistration-Request is generated by a CM (SCM, LCM, or CCM) and is forwarded outbound on a single branch in the SWAN topology.

An AP or CM returns a Deregistration-Reply to acknowledge receipt of a Deregistration Request, delete the respective path instance, and (optionally) to return context and status information. Transient accounting statistics and an activity timestamp are (optionally) returned in the Deregistration Reply.

An AP or CM sends a Detach-Request message to its parent CM to indicate that a "detached" child station should be "deregistered". A Detach-Request message is forwarded inbound until it reaches either a CM with a "newer" registration record or the CCM.

A CM can send a Detach-Reply message to acknowledge a Detach-Request.

A Context-Request message is used to get or set context, configuration, or management information. Context messages provide a general-purpose transport for exchanging information. A Context-Request can be used, for example, to initiate a lateral handoff when a station roams from an old LCM to a new LCM. The new LCM or the old LCM may send the Context-Request. A Context-Request that is generated by the old LCM may contain context and configuration information. A Context-Request message can also be used to predictively forward mobility context for a MN to SCMs or APs. [A Context-Request that is used to "get" information contains one or more "request" TLVs.]

A Context-Reply message is used to acknowledge a Context-Request message. It is also used to return status information (e.g. for a "set" request) or context, configuration, or management information (e.g. for a "get" request) for a corresponding Context-Request message.

A Path-Update-Request message is used to re-establish the backward-learned path between a wireless station and each correspondent host, when the wireless station roams from an old AP to a new AP within a single subnet. The Path-Update-Request is sent from the new AP to the old AP, with the source 802 address of the station that roamed.

A Path-Update-Reply message is, optionally, used to acknowledge a Path-Update-Request message and it is used to transfer transient context information directly from an "old AP" to a "new AP".

A Path-Check message is used to implement a Reliable Path Update mechanism (i.e. to recover from lost Path-Update-Request messages).

A Trace-Request message is used for SWAN path testing, response time analysis, and station tracking.

A Trace-Reply is used to acknowledge a Trace Request.

AAA messages are encapsulated 802.1X EAPOL messages typically used for authentication. Alternately, AAA messages could also be typed to designate the beginning (START) or end (SUCCESS) of an AAA message exchange. Finally, AAA messages are also encapsulated Cisco accounting messages typically used by the AP to update the session accounting maintained by the AS. When the MN is employing Cisco's Central Key Management (CCKM), initial key establishment between the MN and MN Authenticator, is triggered by the MN Authenticator initiating a 4-way handshake by sending the MN an EAPOL Key message with a 16 byte nonce. To achieve this, a nonce is passed from the MN Authenticator to the AP using an AAA Success message. Details of the key establishment are described in the Fast Handoff Protocol Specification. This is the only EAPOL Key message generated by the SWAN Topology, all others are results of 802.1X EAP Authentication.

AAA messages are WLCCP encapsulations of 802.1X EAPOL or Cisco session accounting messages and thus do not follow the Request-Reply norm. However, since Authenticators can detect authentication failures, the Status field provided in the outbound messages can provide more information to reflect authentication status.

Path-Init Request, Reply, Confirm, Ack. Path-Init messages are used for IN path authentication, where an IN mutually authenticates and establishes a path CTK with each of its ancestors. The necessary path authentication 4-way handshake may consist of 1) a Path-Init Request/Reply exchange followed by an initial Registration Request/Reply exchange, or 2) a Path-Init Request/Reply/Confirm/Ack exchange. (The second sequence is used to refresh path CTKs for a registered IN.)

WLCCP fields are defined in network byte and bit order (i.e. big endian). The bits in each field are numbered from left to right starting with '0' (i.e. the high-order bit is bit '0').

WLCCP messages can be encapsulated in Ethernet frames or UDP/TCP/IP packets. Ethernet encapsulation can be used for intra-subnet messages sent between two APs or an AP and SCM, which are on the same subnet. IP encapsulation is used for inter-subnet messages. The WLCCP Ethernet DIX type is 0x872d. The WLCCP UDP/TCP protocol port is decimal 2887. It is a "well-known" protocol port that is registered with the Internet Assigned Number Authority.

A single WLCCP message format is used for both Ethernet and IP encapsulation. All WLCCP messages share a common header format, which is defined below. The header format is defined so that it is unambiguous with existing Ethernet and IP DDP message formats. The WLCCP message body, which follows the common header, contains SAP-specific message types. This document defines message formats for the WLCCP "Context Management" SAP, which is '0'.

An example Ethernet-encapsulated WLCCP Context Management frame 2000 is shown in FIG. 20. The frame 2000 comprises the destination MAC address 2002, the source MAC address 2004, the DIX Type (0x872D for this example) 2006, WLCCP Common Header 2008, WLCCP Context management header 2010, Type-specific fields 2012, and Optional TLVs 2014.

In general, Ethernet encapsulation can be used for WLCCP messages that are limited to a single subnet. IP encapsulation is required for all inter-subnet messages. Ethernet encapsulation is used for SCM-Advertisement messages and intra-subnet Registration, Deregistration, Detach, Path-Update, and Path Check messages. UDP/IP encapsulation is used for CCM Advertisement messages and inter-subnet Registration, Deregistration, and Detach messages. Either Ethernet or UDP/IP encapsulation can be used for Trace messages. Ethernet, UDP/IP, or TCP/IP encapsulation can be used for Context messages.

Referring now to FIG. 21 there is a table illustrating the fields for a WLCCP Message Header 2100. The columns comprise the Field Name 2102, Offset 2104, Size 2106 and a Description 2108 of each field of the message header 2100.

In an example embodiment, the length of the fixed WLCCP header 2100 is 28 bytes. The fields Protocol ID/Version 2110, WLCCP SAP 2112 and Destination Node type 2114 are common to all WLCCP SAPs. The remaining fixed fields are common to all Context Management frames (i.e. all frames defined in this document). If the Relay Flag is set ON, then the header is immediately followed by an 8-byte Relay Node ID field.

In an example embodiment, the WLCCP Protocol ID 2110, 0xC0, is defined so that WLCCP and DDP messages can share the same DIX Ethernet type and UDP protocol port. The DDP message header is defined in Appendix B.

The Destination Node Type 2114 and WLCCP SAP 2112 fields are used to select the internal destination within the device identified by the Ethernet or IP destination address. The sender sets the Destination Node Type 2114 to the node type of the immediate receiver, before sending a WLCCP message. The Destination Node Type 2114 can be '0' if the SAP uniquely identifies the internal destination.

The Hop Count 2116 field contains the number of WLCCP hops (minus one) between the Originator and Responder. The Originator or Responder initializes the Hop Count to '0'. The Hop Count is incremented by each intermediate node on the path to the Originator or Responder. A message is discarded if the Hop Count exceeds a predetermined count.

The Flags field 2120 is used as follows:

The Retry flag is set ON in retransmitted Request or Confirm messages. The Message ID in a retransmitted message is the same as in the original message. The Retry flag is set ON in a Reply or Ack message if it is set ON in the corresponding request message.

The Response-Req Flag is set ON in a request message to solicit a reply.

The TLV flag is set ON to indicate that optional TLVs follow the fixed fields.

The Inbound Flag, Outbound Flag, and Hopwise-Routing Flag determine how a WLCCP message is forwarded (as described below).

If the Root CM Flag is set ON in an inbound message, then the message is forwarded to the CM at the root of the entire Topology Tree—the "root CM". If the Root CM Flag is set ON in an outbound message, then the message originated at the root CM.

If the Relay Flag is set ON, then the WLCCP header is immediately followed by a 64-bit Relay Node ID field (a 16-bit Node Type followed by a 48-bit Node Address).

The MIC flag is set ON to in a message that is authenticated and contains a WTLV_MIC TLV.

The Responder Node Type bits contain the Node Type of the WLCCP node that generated the original reply message.

The Originator Node ID 2122, generally, identifies the node that originated a request message. The Responder Node ID 2124 generally identifies the target of a request message and the source of the corresponding reply message. In a WLCCP Registration message for a MN, the Originator Node ID is the 802 address of the MN. The Responder Node ID may be '0' in Registration Request, Advertisement Request, or Detach Request messages. The Responder Node ID may be '0' in any IP-encapsulated Request message. The Responder Node ID identifies the source of a solicited or unsolicited Advertisement Reply message.

The Hop Source Node ID contains the WLCCP Node ID of the hop source of a request or reply message.

Optional parameters may follow the fixed fields in any WLCCP message. Optional parameters are in the "TLV" format as shown in FIG. 22.

The TLV "Type" 2210 field contains a Container Flag, an Encrypted Flag, a Request Flag, a Group ID and a Type ID. A "request TLV" has the Request Flag set ON in the Type ID field.

TLV Group IDs are used to group TLVs hierarchically. A Group ID can be used to identify the software module in the target node processes the respective TLV type.

The Request Flag is set on in a TLV in a WLCCP request message to "request" information from the target WLCCP node. A "request TLV" has the Request Flag set ON.

The TLV Container Flag can be used to group fixed attributes and other optional TLVs into a single "container TLV". The Container Flag should only be set ON in a TLV if any required TLV fields are followed by other optional TLVs. Container TLVs can be nested.

A WLCCP inter-AP SSID is contained in a standard 802.11 SSID element.

The general operation of the architecture will now be disclosed.

A Request message is forwarded from the Originator to the Responder. A Reply message is forwarded from the Responder to the Originator. The Inbound and Outbound flags determine how a message is forwarded. If both the Inbound and Outbound flags are set OFF, then a message is forwarded via IP routing and/or transparent bridging to the target destination (i.e. to the "Responder" in a Request message).

The Inbound Flag or Outbound Flag is set ON in a message to indicate that the message is being forwarded inbound or outbound, respectively, on a branch of the Topology Tree. It is an error if a node receives an "inbound" message from a node that is not a descendant. It is also an error if a node receives an "outbound" message from a node that is not an ancestor.

The Hopwise-Routing Flag is set ON in an inbound or outbound message to force intermediate APs to process the message, where an "intermediate AP" is any AP on the topology tree branch between the Originator and the Responder of the message. A "hopwise-routed" inbound message is forwarded to the hop address of the parent node; an outbound message is forwarded to the "Next Hop" on the path to the target node. A hopwise-routed message is processed by each node on the inbound or outbound path. It is an error if a node receives a hopwise-routed message from a Hop Source that is not a neighbor.

The Hopwise-Routing Flag can be used in a registration message, for example, to update Layer 2 path information in each AP on the path to a MN. The Responder is the SCM in a Proxy Registration message generated by an AP. FIG. 23 illustrates how hopwise routing is used. If Layer 2 path updating is enabled (as in the W2 implementation), then Registration messages are forwarded with Hopwise-Routing set ON. If Layer 2 path updating is not enabled (as in the W1 implementation) then Registration messages are forwarded with the Hopwise-Routing Flag set OFF.

If the Relay Flag is set ON, in a WLCCP message, then the general WLCCP header is immediately followed by a Relay Node ID field. If the Relay Node ID field is non-zero, then it contains the Node ID of any intermediate node that "relayed" the respective message. The Relay Node ID is initialized to all zeroes by both the Originator and Responder. As shown in FIG. 23, AP 2304 is the relay node for a hopwise-routed message sent from AP 2306 to the SCM 2302; therefore, AP 2304 sets the Relay Flag ON and enter its Node ID in the Relay Node ID field before forwarding the message inbound to the SCM.

If the Root CM Flag is set ON in an inbound request message, then the message is forwarded inbound to the CM at the root of the entire Topology Tree—the root CM. In a campus network, for example, the message is forwarded to the CCM. For example, an AP can use the Root CM Flag to forward a MN's IP address to the CCM. The AP can simply send a request message to its parent SCM that contains the MN's IP address and has the Root CM Flag set ON.

In many cases the original Responder of a request message forwards the message on the path to the final destination. For example, an SCM forwards an inbound Registration Request to its parent LCM if the SCM is not the "nearest common ancestor" or if the Root CM Flag is set ON. Likewise, an LCM forwards an outbound Deregistration Request to the parent SCM of the Target Node. An original or intermediate "relay Responder" forwards such a message as follows: a) The Responder field is updated with the Node ID of the next-hop CM, b) The relay Responder enters its Node ID in the Relay Node ID field, c) The Originator and Message ID fields are unchanged. The relay Responder does not update the Responder field in any corresponding Reply message; therefore, the Responder field in the Reply message will contain the Node ID of the "final Responder" when it is received by the Originator.

The Originator of a Request message sets the Response-Req Flag ON to solicit a corresponding Reply message. The Originator is responsible for error recovery if an expected Reply message is not received. An Originator starts a "retry timer" for each outstanding Request message that requires a Reply. A Request message is retransmitted, with the Retry Flag set ON and the original Message ID, if an expected Reply message is not received before the respective timer expires. A retry timer is not needed in an intermediate "relay Responder", which forwards a Request message on the path to the final Responder.

An Originator or relay node can include a Reply_State TLV in a Request message, to reduce the amount of state information that is kept in memory. A Reply_State TLV contains information that is necessary to process (e.g. forward) a Reply message.

AP message forwarding logic is generally independent of the network infrastructure. The parent SCM is the Responder in messages generated by an AP, with one exception. [If Layer 2 path updating is enabled, then the Responder in an initial Registration Request generated by a non-root AP is the parent AP.] In a local or campus infrastructure, the SCM forwards AP messages to the root CM as required. Likewise, SCM message forwarding logic is the same in a standalone local infrastructure or a campus infrastructure. The parent LCM is the Responder in messages generated by the SCM. In a campus network, the LCM forwards SCM messages to the CCM, as required.

A WLCCP node accepts "valid" WLCCP messages transmitted on its native VLAN. All other messages are discarded. A message is invalid if it fails a Message Integrity Check or if the message type is unknown.

The WLCCP Registration and Handoff Protocol is used to establish, maintain, and delete branches and path instances in the SWAN Topology Tree. Registration (and deregistration) messages are also use to transfer context information when a node roams. Each authenticated child CM, AP, and MN in a SWAN network is registered with the root of the SWAN Topology Tree—the root CM. In general, each CM, AP, and MN in a sub tree is reliably registered with the CM at the root of the sub tree. Example registration and handoff message sequences are shown in following sections.

The Registration and Handoff Protocol is implemented with three message types—Registration, Deregistration, and Detach.

Each MN, AP, and child CM successfully authenticates (or reauthenticates) before it is registered with the SWAN infrastructure.

An inbound "initial" Registration Request is generated to initially register a node with the root CM after it has successfully (re)authenticated. A Registration Request is acknowledged by a Registration Reply that contains a matching Message ID. An outbound initial Registration Reply establishes a Path Instance, which is (optionally) identified by a Path ID. An "update Registration Request" is used to refresh the registration state of an Attached station. An update Registration Request is also used to update the context information cached in ancestor nodes.

"Proxy" Registration Request/Reply messages are used to register WLCCP-unaware MNs. A "registered" parent AP generates a proxy "initial" Registration Request for an associated MN after it successfully authenticates.

A Registration message contains an Initial Flag, which is set ON in an "initial" Registration message and OFF in an "update" Registration message. A Registration message has a Proxy Flag, which is set on in a "proxy" Registration message generated "in proxy" by a parent AP for a non-WLCCP MN. An "initial, proxy" Registration message, for example, has both the Initial Flag and the Proxy Flag set ON.

In general, a Registration Request for a node, which has roamed, is forwarded inbound until it reaches the "nearest common ancestor CM". The "nearest common ancestor CM" is the CM that is at the root of the smallest sub tree that includes the CM and both the old and new parent nodes. For example, the SCM is the nearest common ancestor when a MN roams within a single subnet. An LCM is the nearest common ancestor when a MN roams between subnets in the same Local Control Domain. The nearest common ancestor CM is referred to as the "common CM".

The common CM returns a Registration Reply outbound to acknowledge the Registration Request and to establish a new path instance for the "Requester Node". The common CM (optionally) "deregisters" any old path instance, when it establishes the new path instance for the node.

A non-parent CM or AP forwards an "initial" or "proxy" Registration Reply to the "parent" of the Requester Node, identified by the Requester Node ID field. Therefore, the parent node is the Originator of any "initial" or "proxy" Registration Request that it forwards inbound for a child Requestor Node.

The Root CM Flag is set ON in a Registration Request to force a "full path update". A Registration Request is forwarded to the root CM if the Root CM Flag is set ON.

The Path ID field in an "initial" Registration Request is set to '0'. The parent CM (optionally) establishes the path ID, for a path instance, by entering a path ID value into the Path ID field of an initial Registration Reply. The Path ID field in an "update" Registration Request is set to the path ID for the path instance.

A Registration Request is transmitted with the Response-Req Flag set ON, to solicit a Reply. A Registration Request message is retransmitted if an expected matching Reply is not received, until a REGISTRATION_RETRY_MAX limit is exceeded. The same Message ID is used for the original Registration Request and all retransmissions.

In general, received Registration Requests are ordered by time-of-arrival. The Registration Delay field is, optionally, used to order received Proxy Registration Requests that are generated by a parent AP for a child node. The Delay field contains the elapsed time, in hundredths of seconds, since the respective child node last transmitted an uplink frame. A Registration Record in a CM contains a timestamp field that contains the "time-of arrival" of the last Registration Request. The time-of-arrival is calculated by subtracting the Delay value from the current time.

A parent AP or SCM forwards a Registration Reply to a child AP by sending it to the port MAC address contained in the Hop Source field in the original Registration Request. A parent CCM or LCM forwards a message to a child CM by sending it to the hop IP address of the child CM.

If WLCCP is used to establish forwarding paths, then an "old" path instance is deleted when a node roams. Inbound Deregistration Reply and Detach Request messages are optionally used to delete old path instances. A Deregistration Request is generated by a "common CM" to delete any old path instance when a new path instance is established. Also, an "administrative" Deregistration Request can be generated by the Root CM to administratively disconnect a node.

A parent AP generates a Detach Request, when a child node is disassociated. If the child node is an AP, then the sub tree rooted at the AP is deleted. Deregistration and Detach logic is described in more detail below.

Each AP in a subnet, and any MNs associated with the AP, are registered with the active SCM for the subnet. An AP discovers the "active SCM" via the SCM advertisement protocol, as described above. Each MN is registered with the SCM for its parent AP, even if the MN belongs to a different subnet.

Intra-subnet registration logic is implementation-specific. In the simple W1 implementation, WLCCP registration is used to establish and distribute context information between the SCM and child APs. It is NOT used to establish the Layer 2 forwarding path. The L2-Path-Update Flag is set OFF and the Hopwise-Routing Flag is set OFF in Registration messages in the W1 implementation. Detach and Deregistration messages are not used in the W1 implementation.

If Layer 2 path updating is enabled, then WLCCP registration reliably establishes the wireless forwarding path between the primary LAN and wireless stations, so that it is not necessary to flood unicast frames to 802.11 stations. Registration, Deregistration, and Detach messages are forwarded with Hopwise Routing so that each AP on the path instance can process the message. A Registration Reply, for example, is forwarded outbound, with hopwise routing, by sending it to the MAC or IP destination address of the "next hop" on the path to the target node. A Deregistration Reply or Detach Request is forwarded inbound, with hopwise routing, by sending it to the MAC or IP destination address of the parent node identified in the "Parent Node Record".

Non-WLCCP bridges and switches transparently forward registration messages.

Referring to FIG. 24 there is shown a block diagram illustrating a mobile node 2412 roaming from a first access point 2408 to a second access point 2410 on a campus network 2400. The network 2400 comprises a CCM 2402 which is an IN 802.1X Authenticator, an LCM 2404 which is a MN 802.1X authenticator, an SCM 2406, a first access point 2408, second access point 2410, and the mobile node 2412.

Figure 25:
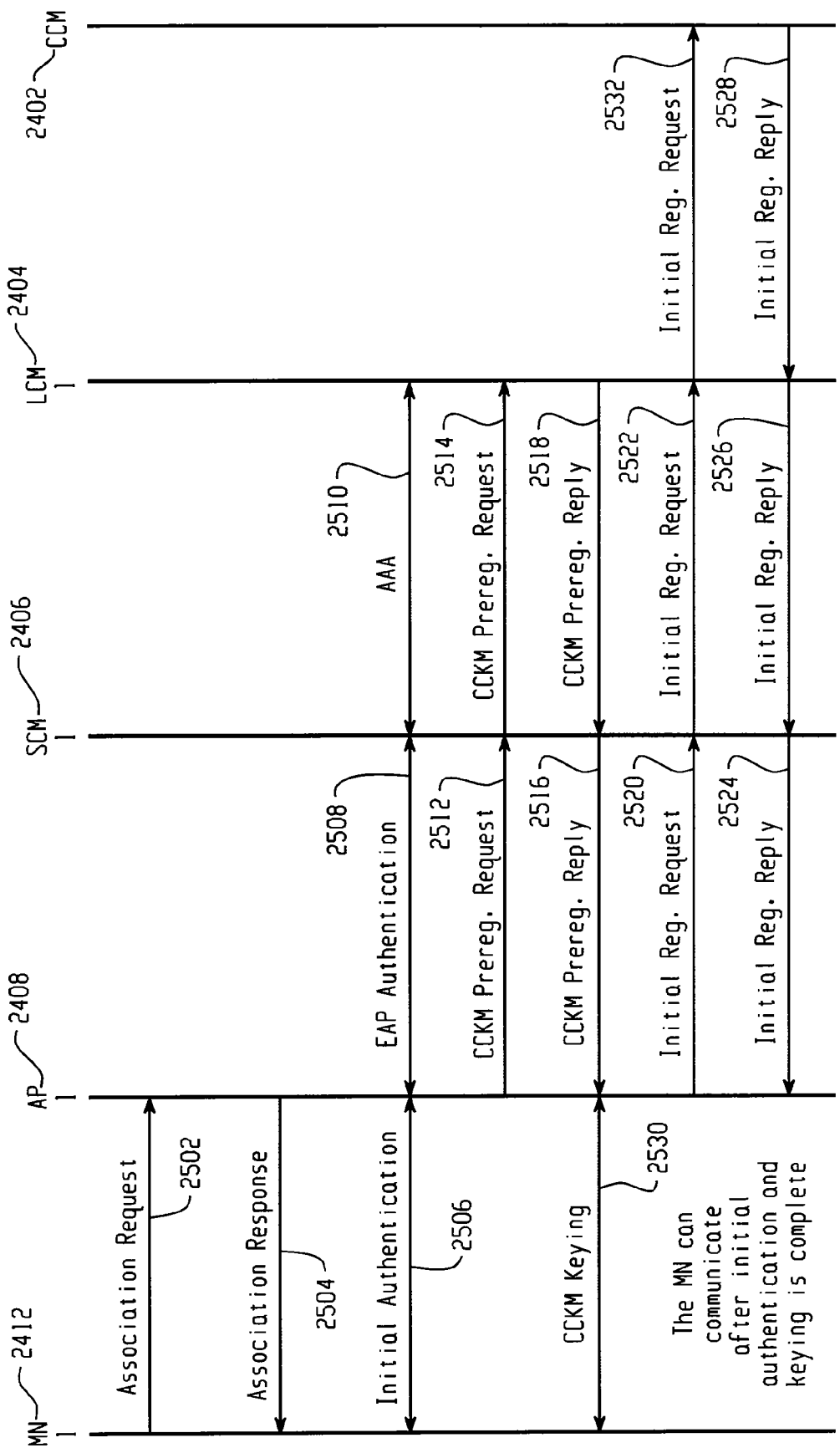
FIG. 25 is an example of the message sequences for initial mobile node association.

The message sequence for registering mobile node 2412 is illustrated in FIG. 25. FIG. 25 shows the message sequences for the mobile node 2412 as it first associates and authenticates with access point 2408, and FIG. 25*b* shows the message sequences as the mobile node 2412 roams to the second access point 2410. The arrows indicate the direction of the message (source->destination or bi-directional <->) and the vertical bars indicate the network component.

Mobile node 2412 associates with the first access point 2408. The steps comprise sending the association request 2502 from the mobile node 2412 to the first access point 2408 and the first access point 2408 sending an association response 2504. The mobile node 2412 then authenticates with LCM 2404 (the MN 802.1X authenticator) and the first access point 2408. The mobile node 2412 performs an initial authentication 2506 with the first access point 2408, an EAP authentication 2508 is then performed between the first access point 2408 and the SCM 2406, and a AAA request 2510 is performed between SCM 2406 and LCM 2404.

For CCKM mobile nodes, preregistration is employed. The preregistration starts by the first access point 2408 sending an initial proxy registration request 2512 to SCM 2406. SCM 2406 then forwards the initial registration request 2514 to LCM 2404 The CCKM preregistration reply 2418 is sent from LCM 2404 to SCM 2406, then as shown by 2516 from SCM 2406 to the first access point 2408, and the first access point 2408 sends the CCKM keying 2530 to the mobile node 2412. The mobile node 2412 can communicate after initial authentication and keying is complete.

The first access point then sends an initial proxy registration request 2520 to the SCM 2406, the SCM 2406 then forwards the initial proxy registration request 2522 to the LCM 2404 with the LCM 2404 as the responder, then LCM 2404 forwards the initial registration request 2532 to the CCM 2402 with the CCM as the responder. The CCM 2402 then sends an initial registration reply 2528 to LCM 2404. LCM 2404 then forwards the initial registration reply as shown by 2526 to the SCM 2406. The SCM 2406 then forwards the initial registration reply to the first access point 2408 as shown by 2524.

Figure 26:
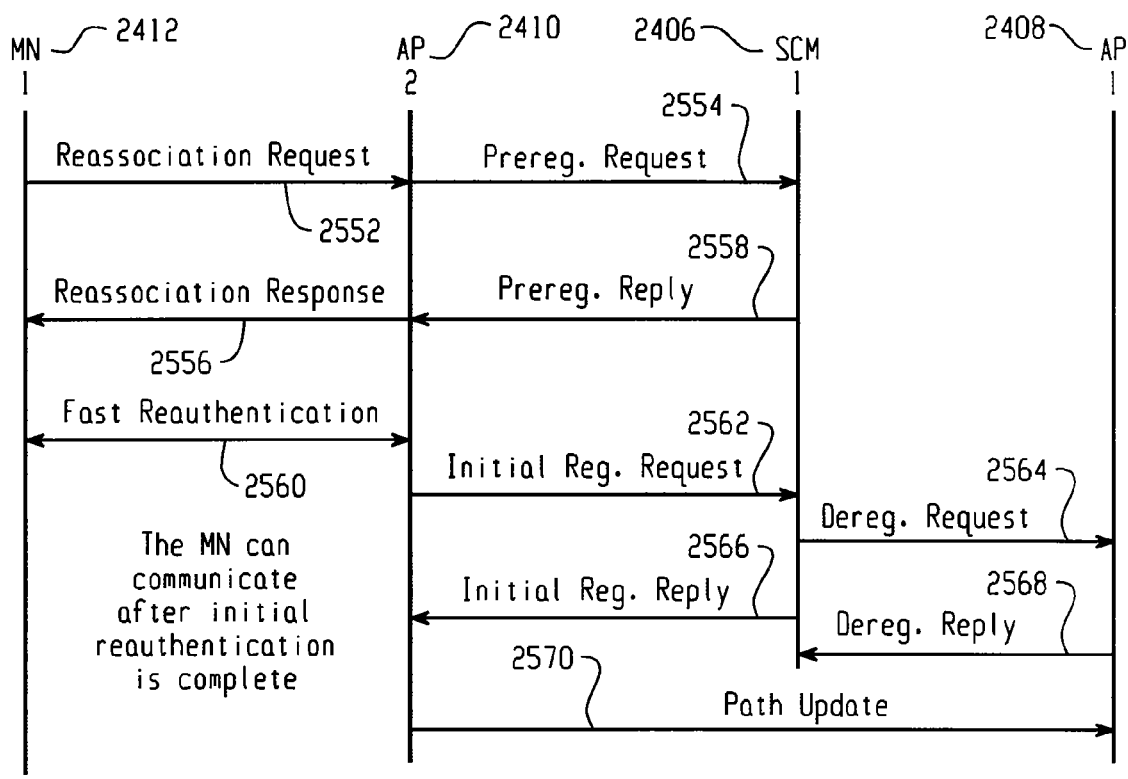
FIG. 26 is an example of the message sequences for a mobile node roaming from a first access point to a second access point.

Referring now to FIG. 26, there is illustrated the messaging sequence when the mobile node roams from the first access point 2408 to the second access point 2410. Mobile node 2412 reassociates with the second access point 2410 by sending a reassociation request 2552. The second access point 2410 then sends a preregistration request 2554 to SCM 2406 to obtain the dynamic credentials for the mobile node 2410. SCM 2406 then sends a preregistration reply 2558 to the second access point 2410. The second access point 2412 then sends a reassociation response 2556 to the mobile node 2412. The mobile node 2412 then re-authenticates with the second access point 2410 using its dynamic credentials by fast reauthentication 2560. The mobile node can communicate after reauthentication is complete. The second access point 2410 then sends an initial proxy registration request 2562 to SCM 2406 for the mobile node 2412. SCM 2406 then sends a deregistration request 2564 to the first access point 2408. SCM 2406 then sends a initial registration reply 2566 to the second access point 2410. The first access point 2408 sends a deregistration reply 2568 to SCM 2406. The second access point 2410 sends a path update request 2570 to the first access point 2408.

Figure 27:
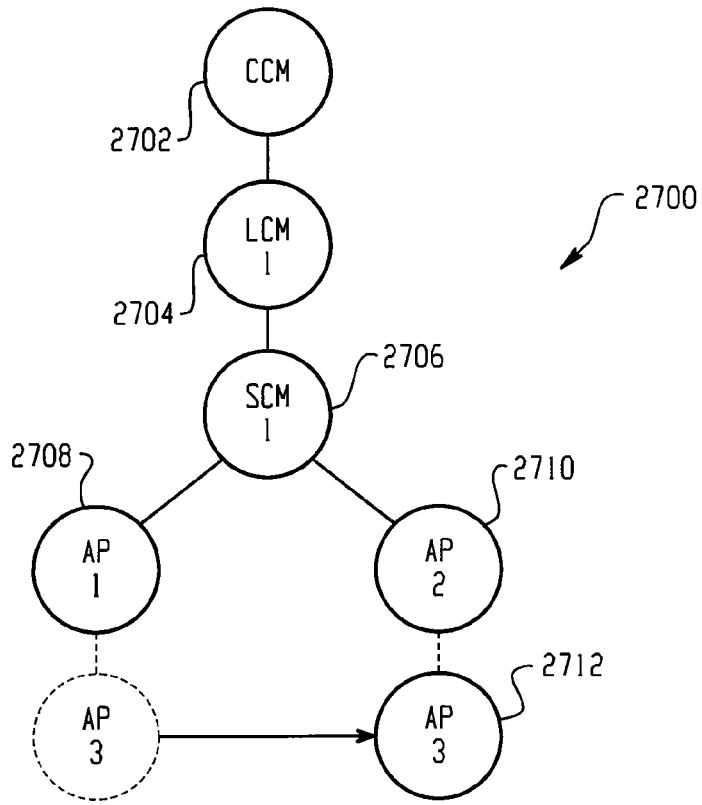
FIG. 27 is a block diagram illustrating a handoff of a repeater access point from a first access point to a second access point.

Referring to FIG. 27 there is shown a block diagram illustrating a repeater access point 2712 roaming from a first access point 2708 to a second access point 2710 on a campus network 2700. The network 2700 comprises a CCM 2702 which is an IN 802.1X Authenticator, an LCM 2704, an SCM 2706, a first access point 2708, second access point 2710, and the repeater access point 2712.

Figure 28A:
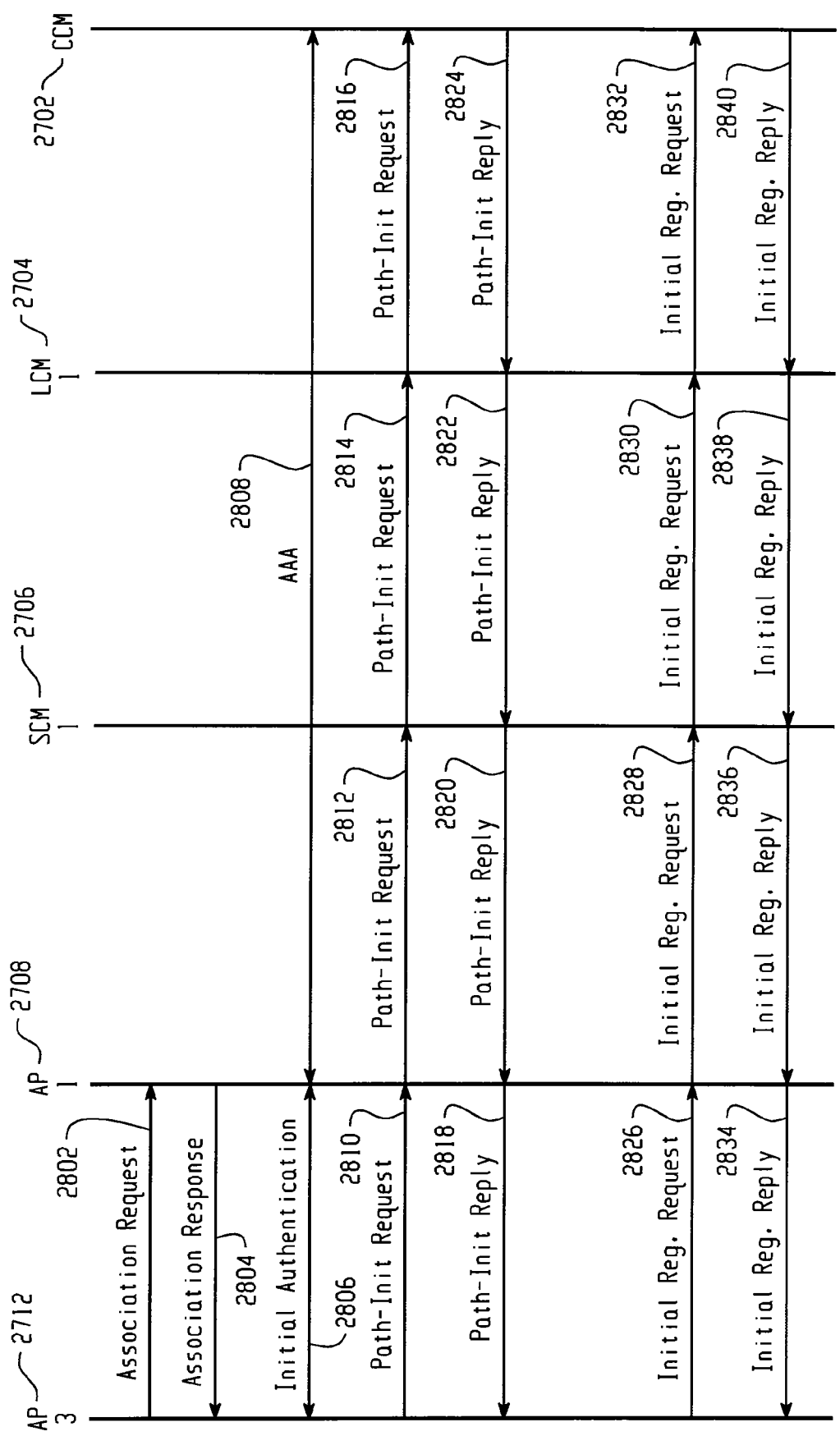
FIG. 28a is an example of the message sequences for initial repeater access point association.
Figure 28B:
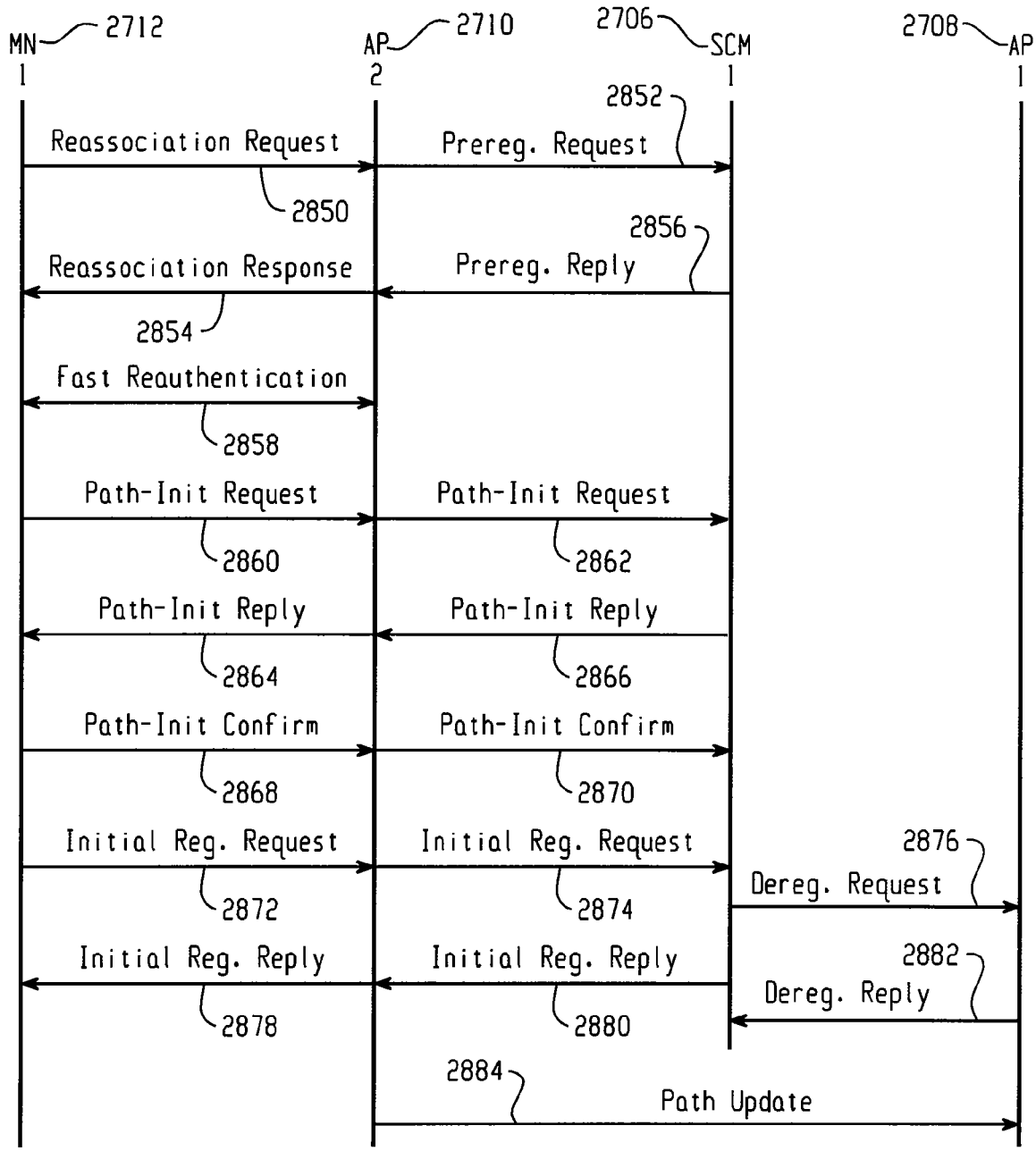
FIG. 28b is an example of the message sequences for a repeater access point roaming from a first access point to a second access point.

The message sequences for registering and deregistering repeater access point 2712 are shown in FIGS. 28*a* and 28*b*. FIG. 28*a* shows the message sequences for the repeater access point 2712 as it first associates and authenticates with access point 2708, and FIG. 25*b* shows the message sequences as the repeater access point 2712 roams to the second access point 2710. The arrows indicate the direction of the message (source->destination) and the vertical bars indicate the network component.

Referring to FIG. 28*a*, the repeater AP 2712 (AP 2712) associates with the first access point 2708 (AP 2708). This process comprises AP 2712 sending an association request 2802 to AP 2708 and AP 2708 responding with an association response 2804. AP 2712 then authenticates with CCM 2702, the IN 802.1X Authenticator, and AP 2708 via initial authentication 2806 and AAA 2808.

AP 2712 then sends a Path-Init request to AP 2708 with AP 2708 as the responder. AP 2708 then sends the Path-Init Request to SCM 2706 as shown by 2812 with SCM 2706 as the responder. SCM 2706 forwards the Path-Init Request to LCM 2704 as shown by 2814 with LCM 2704 as the responder. LCM then forwards the Path-Init request to CCM 2702 as shown by 2816 with CCM as the responder. As shown by 2834, CCM 2702 then sends a Path-Init Reply to the LCM 2704 with AP 2708 as the originator. The LCM 2704 sends the Path-Init reply to SCM 2706 with AP 2708 as the originator as shown by 2822. SCM 2706 sends the Path-Init reply to AP 2708 as shown by 2820. AP 2708 sends the Path-Init reply to AP 2712 as shown by 2818.

AP 2712 then sends an Initial Registration Request 2826 to AP 2708 with AP 2712 as the Responder. AP 2708 sends the Initial Registration Request to SCM 2706 for AP 2712 with SCM 2706 as the Responder at 2828. At 2830, SCM 2706 forwards the Initial Registration Request to LCM 2704 with LCM 2704 as the Responder. Then at 2832, LCM 2704 forwards the Initial Registration request to CCM 2702 with CCM 2702 as the Responder. At 2840 CCM 2702 sends an Initial Registration Request Reply to LCM 2704. At 2838 LCM 2704 then forwards the Initial Registration Request Reply to SCM 2706. Then at 2836 SCM 2706 forwards the Initial Registration Request Reply to AP 2708, which then at 2834 forwards the Initial Registration Request Reply to AP 2712.

Referring now to FIG. 28*b* there is shown the sequence of messages that occurs when the repeater AP (AP 2712) roams from the first access point 2708 (AP 2708) to a second access point 2710 (AP 2710). The process begins at 2850 when AP 2712 sends a reassociation request to AP 2760 and indicates a "fast reauthentication" capability. At 2852 AP 2710 then sends a Preregistration Request to SCM 2706 to obtain the dynamic credentials for AP 2712. SCM 2706 sends a Preregistration reply to AP 2710 at 2856. AP 2720 then sends a reassociation response to AP 2712 at 2854. At 2858 AP 2712 reauthenticates with AP 2710 using its dynamic credentials.

AP 2712 then sends a Path-Init Request to AP 2710 at 2860 with AP 2710 as the Responder. At 2862 AP 2710 sends a Path-Init request to SCM 2706 for AP 2712 with SCM 2706 as the Responder. SCM 2706 sends a Path-Init Reply to AP 2710 at 2866 with AP 2710 as the Originator. At 2864 AP 2710 sends a Path-Init Reply to AP 2712.

At 2872 AP 2712 sends an Initial Registration Request to AP 2710 with AP 2710 as the Responder. At 2874 AP 2710 sends an Initial Registration Request to SCM 2706 for AP 2712 with SCM 2706 as the Responder. At 2876 SCM 2706 sends a Deregistration Request to AP 2708. At 2880 SCM 2706 sends an Initial Registration Reply to AP 2710. At 2878 AP 2710 sends an Initial Registration Reply to AP 2712. At

2882 AP 2708 sends a Deregistration reply to SCM 2706. AP 2710 sends a Path-Update Request to AP 2708.

The pairwise transient keys (PTKs) used to protect communications between the MN and AP are generated by the MN and AP in all key management schemes.

The AS also accommodates the session timeout setting based on key management approaches. For LEAP, the session timeout remains a function of the 802.11 negotiated cipher suite. However, for either SSN/TGi and CCKM, the session timeout is a function of the mutually derived key of each EAP authentication type.

After a CCKM MN has successfully authenticated, the MN Authenticator triggers a key initialization to establish the Key Request Key (KRK) and Base Transient Key (BTK) before the MN and associated AP can establish PTKs.

To trigger KRK and BTK derivation, the MN Authenticator generates a 16-byte nonce. An EAPOL Key message of the format described in the current TGi Draft is generated to send the nonce to the MN and thus initiate the 4-way handshake used to establish KRK and BTK. The EAPOL Key message is encapsulated in a WLCCP_AAA message and delivered to the MN. The delivery is through the AP, thus the AP will unencapsulate the WLCCP message and forward the EAPOL Key message to the MN. The handshake proceeds as described in the Fast Handoff using Cisco's Central Key Management Protocol Specification.

After a CCKM MN has successfully authenticated, the MN Authenticator triggers a key initialization to establish the Key Request Key (KRK) and Base Transient Key (BTK) before the MN and associated AP can establish PTKs.

To trigger KRK and BTK derivation, the MN Authenticator generates a 16-byte nonce. An EAPOL Key message of the The response from the MN provides a Nonce$_{MN}$ and the negotiated security elements for which the AP can validate. However, the MN Authenticator also validates some of these credentials to ensure that no VLAN hopping occurs.

For an inbound MN pre-registration request, the request includes a Secure Context TLV that includes the AP's identity as the Destination-ID and the negotiated 802.11 security information element (RSNIE) The SSID is also included in the Secure Context request by the MN and checked by the MN Authenticator to ensure that the MN is not hopping VLANs and thus breaching security. The Secure Context's Nonce is provided by the MN as it serves as the keying material used to derive the KRK and BTK.

If the MN has negotiated CCKM then it is also provided a nonce. The AP should trigger an error if the MN does not provide a nonce.

If the MN has negotiated SSN or legacy systems, the AP obtains only the NSK. However, if the MN has negotiated CCKM then the MN Authenticator derives and delivers the BTK to the AP and cache the KRK. Thus, on a response, the MN Authenticator delivers the key (NSK or BTK) to the AP. Since it is an MN requesting such a key, the MN Authenticator will omit the TLV normally used to deliver the NSK or BTK to the MN. This step is redundant and unnecessary as the MN has already mutually derived this key as well as it need not be aware what is behind the AP.

When a MN roams, the new parent AP initiates pre-registration to request the MN's context. To facilitate the context transfer and minimize transactions between AP and MN, CCKM provides a base key, BTK to generate the link key, PTK. The request format is defined as follows:

| Field Name | Length | Description |
| --- | --- | --- |
| WTLV_MN_SECURE_CONTEXT_REQ | 2 | TLV Type |
| TLV Length | 2 | TLV length |
| Key Sequence Counter (KSC) | 4 | A replay counter used to keep state of the rekeys for the link between SID and DID |
| Destination-ID (DID) | 8 | AP ID |
| Supplicant-ID (SID) | 8 | MN ID |
| Reserved | 1 | Used for byte alignment |
| Key Management Type | 1 | 0 - none (NSK is not forwarded) 1 - CCKM 2 - 802.1X Legacy systems 3 - SSN |
| Nonce | 16 | Random value provided by the DID |
| SSID | L | SSID TLV |
| RSNIE | P | Propagate the RSNIE$_{MN}$ for authentication if State = 0 |
| Optional (CCKM) TLV | M | For CCKM, include WTLV_CCKM_REASSOCIATE |
| MIC | N | SECURE CONTEXT MIC TLV | format described in the current TGi Draft is generated to send the nonce to the MN and thus initiate the 4-way handshake used to establish KRK and BTK. The EAPOL Key message is encapsulated in a WLCCP_AAA message and delivered to the MN. The delivery is through the AP, thus the AP will unencapsulate the WLCCP message and forward the EAPOL Key message to the MN.

When MNs successfully authenticate into the network, the MN Authenticator will cache its NSK and other relevant security credentials. If CCKM is the negotiated Authenticated Key Management selector, the MN Authenticator responds with an EAPOL Key to the MN and trigger establishment of the KRK and BTK.

The new AP identifies the MN by using its MAC address. The BSSID, RN and MIC$_{MN}$ is provided by the MN. The RN is encapsulated as the KSC. The MIC is an HMAC-MD5 operation over the entire WTLV_MN_SECURE_CONTEXT_REQ message, beginning with the WLTV_MN_SECURE_CONTEXT_REQ type through and including the MIC$_{MN}$. The MIC$_{MN}$ is provided if State=0; this signifies that the MN has negotiated CCKM and it is authenticating itself with the MN Authenticator via the specified MIC$_{MN}$.

The SSID serves as a means for the MN Authenticator to validate security credentials for the MN and ensure that the MN is not switching to a prohibited VLAN. While the MN Authenticator can effectively match the security credentials, it is up to the AP to decide on policy; e.g. the AP defines what state it will transition to upon a failure. The MN Authenticator also validates the MN's authorization by computing and matching the provided $MIC_{MN}$. Finally, it also ensures that the session timeout for the MN has not expired. On a successful response, the MN Authenticator will safely deliver the BTK to the new AP and affect a switch from old AP to new AP. That is, the MN's registration entry will reflect the new AP's BSSID and the RN will be incremented by one. The response TLV is defined as follows:

-continued

| Status | Value | Description |
|---|---|---|
| SSID | 3 | Invalid SSID |
| SESSION EXPIRED | 5 | MN's session has expired |
| BAD MIC | 6 | MN's MIC did not match Authenticator's computed MIC |

| Field Name | Length | Description |
|---|---|---|
| WTLV_MN_SECURE_CONTEXT_REPLY | 2 | TLV Type |
| TLV Length | 2 | TLV length |
| Key Sequence Counter (KSC) | 4 | RN value |
| Destination-ID (DID) | 8 | Ancestor with whom IN wants to rekey |
| Supplicant-ID (SID) | 8 | Requesting IN |
| Nonce | 16 | Random value provided by the DID |
| Session Timeout | 4 | Remaining session timeout for MN |
| Optional Rx Key Length | 2 | Length of key delivered (in bytes) |
| Optional Rx Key | Q/32 | BTK if Key Management type = 1 (Q = 32) NSK or MS-MPPE Rx Key otherwise |
| Optional Tx Key Length | 2 | 0 if Key management type = 1 Tx Key length otherwise |
| Optional Tx Key | Key len | MS-MPPE Tx Key otherwise |
| Optional MN Credential TLV | P | MN's cached credentials |
| MIC | N | WTLV-MIC for SECURE_CONTEXT |

The WTLV_MN_SECURE_CONTEXT_REPLY response is encrypted from the WTLV_MN_SECURE_CONTEXT_REPLYNonce field through the end (up to but excluding) the WTLV-MIC using the CTK established between the AP and MN Authenticator. Similarly, the same fields are authenticated using HMAC-MD5.

Since the MN Authenticator provides the MNs session timeout to the active AP, it is up to the AP to enforce a re-authentication prior to the expiration of the session timeout.

If the MN Authenticator fails in any of the checks required for a secure context transfer, then the response will populate the BTK field with all zeroes and include one of the following status values:

| Status | Value | Description |
|---|---|---|
| NO CONTEXT | 1 | MN does not have cached credentials (no registration entry) |
| REPLAY | 2 | RN is out of sequence |

MN's credentials are forwarded during a MN registration. If the credentials are being forwarded, then no optional key is forwarded, rather a new TLV holding most of the MN's cached credentials are propagated to the MN's ancestry infrastructure nodes, terminating at the SCM. In the standalone mode, the SCM does not forward credentials unless predictive roaming is (statically) configured at the time SCM or LCM is initialized. The MNs credentials are forwarded using the WTLV_MN_SEC_CONTEXT.

WTLV_MN_SEC_CONTEXT.

This TLV is only used during a MN Registration Reply to forward its credentials from the MN Authenticator to the MN's ancestors excluding the AP (unless predictive roaming has been configured). For example, if the LCM is the MN Authenticator, the LCM will forward the MN credentials to the SCM.

The TLV is defined as follows:

| Field | Length(bytes) | Description |
|---|---|---|
| WTLV_MN_SEC_CONTEXT | 2 | TLV Type |
| TLV Length | 2 | TLV Length |
| State | 1 | Indicates whether this node is Active or not |
| STA Addr | 8 | WLCCP Node identifier: MN's MAC address |
| Authentication Type | 1 | EAP Type used to authenticate |

| Field | Length(bytes) | Description |
|---|---|---|
| Key Management Type | 1 | Type of (or no) key management negotiated. Valid values are:<br>0 - none (NSK is not forwarded)<br>1 - CCKM<br>2 - 802.1X Legacy systems<br>3 - SSN |
| Session Timeout | 4 | Session expiration time provided by the Radius Access Accept |
| KRK | 16 | Key Request Key used to authenticate MNs request for context transfers |
| BTK | 32 | Base Transient Key used to derive PTKs |
| RN | 8 | Rekey number used to track how many PTKs have been derived from BTK |
| SSID | L | MN's associated SSID TLV |
| VLAN ID | 2 | MN's associated VLAN assignment |
| BSSID | 6 | Defines the current associated AP |
| Cipher | 2 | Negotiated cipher, values are:<br>0x0000 - none<br>0x0001 - WEP<br>0x0002 - TKIP<br>0x0003 - AES-OCB<br>0x0004 - AES-CCMP<br>0x0005 - CKIP<br>0xff<value> - Vendor specific |
| NSK Length | 2 | NSK length in bytes (e.g. Rx MS-MPPE key) |
| NSK | N | The Rx key resulting from a successful 802.1X EAP authentication |
| Tx Key Length | 2 | Tx key length (if sent by Radius) |
| Tx Key | P | The Tx key resulting from a successful 802.1X EAP authentication |

This TLV carries highly sensitive information and thus is encrypted using the CTK shared between the MN Authenticator and the destined IN. In addition, the Secure Context TLV that embeds the MN Secure Credentials TLV is authenticated, e.g. a TLV MIC is also used. The MN Secure Credentials TLV is encrypted from the State field through the Cipher field.

WTLV_UPDATE_RN: Updating Sequencing for PTKs.

This TLV is only valid between APs and MN Authenticators as it is used to update the key sequencing between the AP and MN. Since APs are capable of affecting PTK rekeys, the SCM is appraised of any key refreshes as they occur. A request for update but be sent from the AP to MN Authenticator as follows:

| Type | Len | 8 bytes | 6 bytes | 6 bytes | 4 bytes | 8 bytes |
|---|---|---|---|---|---|---|
| WTLV_KEY_UPDATE | TLV Len | MSC | BSSID | MN MAC Addr | RN | $MIC_{AP}$ |

The WTLV_KEY_UPDATE message is encrypted and authenticated using the CTK established between the AP and MN Authenticator.

The MN Authenticator correctly decrypts and authenticates this request for a successful update and response. That is, if the message can not be decrypted, authenticated nor is the RN greater than the current RN, the MN authenticator discards this message and no update is done. However, the response provides a status to indicate how it failed. The response is defined as follows:

| Type | Len | 8 bytes | 6 bytes | 6 bytes | 4 bytes | 8 bytes |
|---|---|---|---|---|---|---|
| WTLV_KEY_UPDATE | TLV len | MSC | BSSID | MN MAC Addr | RN | MIC$_{AP}$ |

If the update request fails, it will also include a status value from the following table:

| Status | Value | Description |
|---|---|---|
| BAD MIC | 1 | Computed MIC did not match TLV's MIC |
| REPLAY | 2 | RN provided is out of sequence and considered a replay |
| INVALID BSSID | 3 | The specified MN is not associated to given BSSID |
| NO MN | 4 | The specified MN is not registered |

WTLV_NSK

The MN Authenticator may need to request the NSK of the associated AP upon a successful EAP authentication. For legacy MN nodes that only support static WEP keys and/or 802.1X authentication types (such as EAP-MD5) that do not provide dynamic keys, the MN Authenticator uses the AP statically configured NSK for the negotiated SSID/VLAN. To achieve this, a new WTLV is defined to allow the MN Authenticator request the NSK of the associated AP.

The Requesting TLV is defined as:

| Type | Length | 8 bytes | MIC |
|---|---|---|---|
| WTLV_NSK | TLV length | MN-ID | WTLV-MIC |

The Reply TLV is defined as:

| Type | Length | 8 bytes | NSK | MIC |
|---|---|---|---|---|
| WTLV_NSK | TLV length | MN-ID | WTLV_TRANSIENT_KEY | WTLV_MIC |

This TLV is used when pre-shared keys and authentication types such as EAP-MD5 are used and result in using statically configured keys. While this use is highly discouraged due to insecurities, this feature is presented to better support legacy systems and allow for a migration path. The key retrieval would be achieved by using a WLCCP_CONTEXT request/reply exchange between the MN and AP.

The foregoing description of example embodiments has been presented for purposes of illustration and description. It is not intended to be exhaustive or to limit the subject application to the precise form disclosed. Obvious modifications or variations are possible in light of the above teachings. All such modifications and variations are within the scope of the appended claims when interpreted in accordance to the breadth to which they are fairly, legally and equitably entitled.

What is claimed is:

1. A method, comprising:
    initiating a roam, by a mobile node associated with a first access point, from the first access point to a second access point via a two-packet handshake reassociation;
    computing, by the mobile node, a rekey request number derived from a request number of the association with the first access point;
    computing, by the mobile node, a new pairwise transient key based on the rekey request number and a previous pairwise transient key used in the association with the first access point;
    sending a reassociation request packet, by the mobile node, to the second access point, the reassociation request including a mobile node identification, the rekey request number and an authentication element;
    receiving a reassociation response packet, by the mobile node, from the second access point, the reassociation response packet including a response authentication element that includes proof of possession of a group transient key and a second new pairwise transient key derived by the second access point;
    confirming the reassociation response packet, by the mobile node, by verifying the second new pairwise transit key received in the reassociation response packet matches the new pairwise transient key computed by the mobile node;
    in accordance with the second new pairwise transient key matching the new pairwise transient key, decrypting using the new pairwise transient key, by the mobile node, the group transient key of the reassociation response packet;
    re-authenticating, by the mobile node, with the second access point in accordance with the decrypted group transient key; and
    communicating securely, by the mobile node, with the second access point responsive to the mobile node re-authenticating with the second access point.

2. The method of claim 1, wherein the confirming the reassociation response packet further includes verifying a timestamp included in the reassociation response packet.

3. The method of claim 1, wherein the authentication element comprises the new computed pairwise transient key.

4. The method of claim 1, the verifying further comprises verifying the rekey request number is greater than a previous value.

5. The method of claim 1, further comprising computing the authentication element, based on the rekey request number and the new computed pairwise transient key.

6. The method of claim 1, further comprising performing a fast reauthentication using the new pairwise transient key.

7. The method of claim 1, further comprising incrementing the rekey request number prior to computing the authentication element.

8. The method of claim 1, wherein the reassociation response further comprises a basic service set identifier.

9. The method of claim 1, further comprising generating a cryptographic checksum comprising the authentication element with a key request key derived during a previous initial association.

10. The method of claim 1, wherein the association request is sent to an unassociated access point to initiate a roam to the access point.

11. An apparatus, comprising:
a mobile node previously associated with a first access point coupled with a network;
wherein the mobile node is configured to initiate a roam to a second access point coupled to the network, via a two-packet handshake reassociation, by computing a rekey request number derived from a request number of the previous association with the first access point, and computing a new pairwise transient key based on the rekey request number and a previous pairwise transient key used in the previous association with the first access point;
wherein the mobile node is further configured to initiate a roam to the second access point to send an association request packet to the second access point, the association request including a mobile node identification for the mobile node, the rekey request number, and an authentication element;
wherein the mobile node is further configured to receive a reassociation response packet from the second access point, the reassociation response comprising a response authentication element that comprises proof of possession of a groupwise transient key and a second new pairwise transient key derived form the second access point;
wherein the mobile node is further configured to confirm the reassociation response packet by verifying the second new pairwise transit key received in the reassociation response packet matches the new pairwise transient key computed by the mobile node;
wherein the mobile node is further configured to selectively decrypt the group transient key using the new pairwise transient key in accordance with the second new pairwise transient key of the reassociation response packet matching the new pairwise transient key;
wherein the mobile node is further configured to re-authenticate with the second access point in accordance with the decrypted group transient key; and
wherein the mobile node is responsive to re-authenticating with the second access point to begin secure communication with the network through the second access point.

12. The apparatus according to claim 11, wherein the mobile node is further configured to validing a timestamp included in the reassociation response.

13. The apparatus according to claim 11, wherein the authentication element is based on the rekey request number and the new computed pairwise transient key.

14. The apparatus according to claim 11, wherein the mobile node is further configured to perform a fast reauthentication with the second accesss point using the new pairwise transient key responsive to confirming the reassociation response.

15. The apparatus according to claim 11, wherein the mobile node is configured to increment the rekey request number prior to computing the authentication element.

16. The apparatus according to claim 11, wherein the mobile node is configured to increment the rekey request number prior to computing the new pairwise transient key.

17. The apparatus according to claim 11, wherein the reassociation request further comprises the basic service set identifier for the second access point.

18. The apparatus according to claim 11, wherein the mobile node is further configured to generate a cryptographic checksum comprising the authentication element from a key request key derived during a previous initial authentication.

19. The apparatus according to claim 11, wherein the mobile node is configured to acquire the groupwise transient key by decrypting the reassociation response using the new pairwise transient key.

20. An apparatus, comprising:
means for initiating a roam of a mobile node associated with a first access point from the first access point to a second access point via a two-packet handshake reassociation;
means for computing a rekey request number derived from a request number of the association of the mobile node with the first access point;
means for computing a new pairwise transient key based on the new rekey request number and a previous pairwise transient key used in the association of the mobile node-with the first access point;
means for sending a reassociation request packet to the second access point, the reassociation request comprises a mobile node identification, the rekey request number and an authentication element;
means for receiving a reassociation response packet from the second access point, the reassociation response packet comprising a response authentication element that comprises proof of possession of a group transient key and a second new pairwise transient key derived by the second access point;
means for confirming the reassociation response packet by verifying the second new pairwise transit key derived by the second access point and received in the reassociation response packet matches the new pairwise transient key computed by the first access point;
means for decrypting the proof of the possession of the group transient key using the new pairwise transient key in accordance with the second new pairwise transient key matching the new pairwise transient key;
means for re-authenticating with the second access point in accordance with the decrypted group transient key; and
means for communicating securely with the second access point responsive to re-authenticating with the second access point.

* * * * *